(12) United States Patent
Chen et al.

(10) Patent No.: US 11,838,535 B2
(45) Date of Patent: Dec. 5, 2023

(54) BIDIRECTIONAL INTER PREDICTION METHOD AND APPARATUS

(71) Applicant: Huawei Technologies Co., Ltd., Guangdong (CN)

(72) Inventors: Huanbang Chen, Shenzhen (CN); Haitao Yang, Shenzhen (CN); Jianle Chen, San Diego, CA (US)

(73) Assignee: Huawei Technologies Co., Ltd., Guangdong (CN)

( * ) Notice: Subject to any disclaimer, the term of this patent is extended or adjusted under 35 U.S.C. 154(b) by 0 days.

(21) Appl. No.: 17/827,361

(22) Filed: May 27, 2022

(65) Prior Publication Data

US 2022/0286703 A1 Sep. 8, 2022

Related U.S. Application Data

(63) Continuation of application No. 16/948,625, filed on Sep. 25, 2019, now Pat. No. 11,350,122, which is a
(Continued)

(30) Foreign Application Priority Data

Mar. 29, 2018 (CN) .......................... 201810274457.X

(51) Int. Cl.
*H04N 19/577* (2014.01)
*H04N 19/513* (2014.01)
(Continued)

(52) U.S. Cl.
CPC ......... *H04N 19/513* (2014.11); *H04N 19/176* (2014.11); *H04N 19/577* (2014.11); *H04N 19/70* (2014.11)

(58) Field of Classification Search
None
See application file for complete search history.

(56) References Cited

U.S. PATENT DOCUMENTS 9,538,197 B2 1/2017 Xu et al.
11,350,122 B2 5/2022 Chen et al.
(Continued)

FOREIGN PATENT DOCUMENTS

CN 1525762 A 9/2004
CN 102763418 A 10/2012
(Continued)

OTHER PUBLICATIONS

Ma Si Wei et al,"The second generation IEEE 1857 video coding standard", 2015 IEEE China Summit and International Conference On Signal and Information Processing (CHINASIP). IEEE, Jul. 12, J015, pp. 171-175, XP033213589, total 5 pages.
(Continued)

*Primary Examiner* — Christopher G Findley
(74) *Attorney, Agent, or Firm* — WOMBLE BOND DICKINSON (US) LLP

(57) ABSTRACT

Embodiments of this application relate to the field of video picture coding technologies, and disclose a bidirectional inter prediction method and apparatus, to improve coding efficiency. The method includes: obtaining a first motion vector difference of a current picture block; determining a second motion vector difference of the current picture block based on the first motion vector difference, where the first motion vector difference belongs to motion information of the current picture block in a first direction, and the second motion vector difference belongs to motion information of the current picture block in a second direction; and determining prediction samples of the current picture block based on the obtained first motion vector difference and the determined second motion vector difference.

33 Claims, 5 Drawing Sheets

Related U.S. Application Data continuation of application No. PCT/CN2019/071471, filed on Jan. 11, 2019.

(51) Int. Cl.
*H04N 19/176* (2014.01)
*H04N 19/70* (2014.01)

(56) References Cited

U.S. PATENT DOCUMENTS

| | | |
|---|---|---|
| 2007/0110156 A1 | 5/2007 | Ji et al. |
| 2012/0027089 A1 | 2/2012 | Chien et al. |
| 2012/0230392 A1 | 9/2012 | Zheng et al. |
| 2012/0294363 A1 | 11/2012 | Lee et al. |
| 2013/0003851 A1 | 1/2013 | Yu et al. |
| 2013/0058413 A1 | 3/2013 | Guo et al. |
| 2014/0301473 A1 | 10/2014 | Park et al. |
| 2014/0328388 A1 | 11/2014 | Kim et al. |
| 2015/0264390 A1 | 9/2015 | Laroche et al. |
| 2016/0286230 A1 | 9/2016 | Li et al. |
| 2016/0301947 A1 | 10/2016 | Chen et al. |
| 2017/0310990 A1 | 10/2017 | Hsu |
| 2018/0091816 A1* | 3/2018 | Chien .................... H04N 19/70 |
| 2018/0192071 A1* | 7/2018 | Chuang ................ H04N 19/527 |
| 2018/0309990 A1 | 10/2018 | Alshina et al. |

FOREIGN PATENT DOCUMENTS

| | | |
|---|---|---|
| CN | 103039074 A | 4/2013 |
| CN | 103188490 A | 7/2013 |
| CN | 103430540 A | 12/2013 |
| CN | 103444182 A | 12/2013 |
| CN | 104284197 A | 1/2015 |
| CN | 104427345 A | 3/2015 |
| CN | 104717512 A | 6/2015 |
| CN | 105791859 A | 7/2016 |
| CN | 107277532 A | 10/2017 |
| EP | 3038364 A1 | 6/2016 |
| JP | 2007505529 A | 3/2007 |
| JP | 2011166207 A | 8/2011 |
| JP | 2013106312 A | 5/2013 |
| JP | 2015516753 A | 6/2015 |
| RU | 2319317 C1 | 3/2008 |
| TW | 201415904 A | 4/2014 |
| WO | 2016160609 A1 | 10/2016 |
| WO | 2017188509 A1 | 11/2017 |
| WO | 2017204532 A1 | 11/2017 |

OTHER PUBLICATIONS

Chiu Yi-Jen et al:,"Decoder-side Motion Estimation and Wiener filler for HEVC", 2013 Visual Communications and Image Processing (VCIP), IEEE, Nov. 17, 2013, pp. 1-6, XP032543658, total 6 pages.

Huanbang Chen et al, "Symmetrical mode for bi-prediction", Joint Video Exploration Team (JVET) of ITU-T SG 16 WP 3 and ISO/IECJTC 1/SC 29/WG11, 1oth Meeting: San Diego, USA, Apr. 10-21, 2018, Document: JVET-I0063, total 3 pages.

Shfn Yan-Fei et al, Chinese Journal of Computers, vol. 36 No. 11, Nov. 2013, with an English Abstract, 16 pages.

Ashek Ahmmed, Motion Hints Based Inter-Frame Prediction for Hybrid Video Coding, 2013 Picture Coding Symposium (PCS), 4 pages.

* cited by examiner

BIDIRECTIONAL INTER PREDICTION METHOD AND APPARATUS

CROSS-REFERENCE TO RELATED APPLICATIONS

This application is a continuation of U.S. patent application Ser. No. 16/948,625, filed on Sep. 25, 2020, now U.S. Pat. No. 11,350,122, which is a continuation of International Application No. PCT/CN2019/071471, filed on Jan. 11, 2019, which claims priority to Chinese Patent Application No. 201810274457.X, filed on Mar. 29, 2018. All of the afore-mentioned patent applications are hereby incorporated by reference in their entireties.

TECHNICAL FIELD

Embodiments of this application relate to the field of video picture coding technologies, and in particular, to a bidirectional inter prediction method and apparatus.

BACKGROUND

In video coding technology, a prediction picture block of a current picture block may be generated based on only one reference picture block (which is referred to as unidirectional inter prediction), or a prediction picture block of a current picture block may be generated based on at least two reference picture blocks (which is referred to as bidirectional inter prediction). The at least two reference picture blocks may be from a same reference frame or different reference frames.

To enable a decoder and an encoder to use a same reference picture block, the encoder needs to send motion information of each picture block to the decoder in a bitstream. Generally, motion information of the current picture block includes a reference frame index value, a motion vector predictor (MVP) flag, and a motion vector difference (MVD). The decoder may find a correct reference picture block in a selected reference frame based on the reference frame index value, the MVP flag, and the MVD.

Correspondingly, in bidirectional inter prediction, the encoder needs to send motion information of each picture block in each direction to the decoder. Consequently, the motion information occupies a relatively large quantity of transmission resources. This reduces effective utilization of transmission resources, a transmission rate, and coding compression efficiency.

SUMMARY

Embodiments of this application provide a bidirectional inter prediction method and apparatus, to resolve a problem that effective utilization of transmission resources, a transmission rate, and coding compression efficiency are reduced because motion information occupies a relatively large quantity of transmission resources.

To achieve the foregoing objectives, the following technical solutions are used in the embodiments of this application:

According to a first aspect, a bidirectional inter prediction method is provided. The method includes: obtaining indication information used to indicate to determine second motion information based on first motion information, where the first motion information is motion information of a current picture block in a first direction, and the second motion information is motion information of the current picture block in a second direction; obtaining the first motion information; determining the second motion information based on the obtained first motion information; and determining prediction samples of the current picture block based on the obtained first motion information and the determined second motion information.

According to the bidirectional inter prediction method provided in this application, after the indication information is obtained, the second motion information is determined based on the first motion information. In this way, a bitstream needs to include only the indication information and the first motion information, and no longer needs to include the second motion information. Compared with the prior art in which the bitstream includes motion information of each picture block in each direction, the bidirectional inter prediction method provided in this application effectively reduces motion information included in the bitstream, and improves effective utilization of transmission resources, a transmission rate, and a coding rate.

In one embodiment, a method for "determining the second motion information based on the first motion information" is: obtaining an index value of a first reference frame in the first motion information, and determining a sequence number of the first reference frame based on the index value of the first reference frame and a first reference frame list, where the first reference frame herein is a reference frame of the current picture block in the first direction, and the index value of the first reference frame is a number of the first reference frame in the first reference frame list; obtaining an index value of a second reference frame, and determining a sequence number of the second reference frame based on the index value of the second reference frame and a second reference frame list, where the second reference frame herein is a reference frame of the current picture block in the second direction, and the index value of the second reference frame is a number of the second reference frame in the second reference frame list; determining a first motion vector based on a first motion vector difference and a first motion vector predictor flag that are in the first motion information, where the first motion vector is a motion vector of the current picture block in the first direction; and deriving a second motion vector in the second motion information according to the following formula:

$$mv\_lY = \frac{POC\_Cur - POC\_listY}{POC\_Cur - POC\_listX} \times mv\_lX$$

In the foregoing formula, mv_lY represents the second motion vector, POC_Cur represents a sequence number of a current frame, POC_listX represents the sequence number of the first reference frame, POC_listY represents the sequence number of the second reference frame, mv_lX represents the first motion vector, and the second motion vector is a motion vector of the current picture block in the second direction.

In one embodiment, a method for "determining the second motion information based on the first motion information" is: obtaining an index value of a first reference frame in the first motion information, where the first reference frame is a reference frame of the current picture block in the first direction, and the index value of the first reference frame is a number of the first reference frame in a first reference frame list; obtaining an index value of a second reference frame, where the second reference frame is a reference frame of the current picture block in the second direction, and the index value of the second reference frame is a number of the second reference frame in a second reference frame list; determining a first motion vector based on a first motion vector difference and a first motion vector predictor flag that are in the first motion information, where the first motion vector is a motion vector of the current picture block in the first direction; and when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, deriving a second motion vector in the second motion information according to the following formula:

$$mv\_lY=-mv\_lX$$

In the foregoing formula, mv_lY represents the second motion vector, mv_lX represents the first motion vector, and the second motion vector is a motion vector of the current picture block in the second direction.

Both "the first reference frame is a forward reference frame of the current picture block and the second reference frame is a backward reference frame of the current picture block" and "the first reference frame is a backward reference frame of the current picture block and the second reference frame is a forward reference frame of the current picture block" may be represented by using a formula (POC_Cur−POC_listX)*(POC_listY−POC_Cur)>0, or may be represented by using a formula POC_listY=2*POC_Cur−POC_listX. This is not specifically limited in this application.

In addition, both "the first reference frame and the second reference frame each are a forward reference frame of the current picture block" and "the first reference frame and the second reference frame each are a backward reference frame of the current picture block" may be represented by using a formula (POC_Cur−POC_listX)*(POC_listY−POC_Cur)<0.

POC_Cur represents a sequence number of a current frame, POC_listX represents a sequence number of the first reference frame, and POC_listY represents a sequence number of the second reference frame.

In one embodiment, a method for "determining the second motion information based on the first motion information" is: obtaining an index value of a first reference frame and a first motion vector difference that are in the first motion information, and determining a sequence number of the first reference frame based on the index value of the first reference frame and a first reference frame list, where the first reference frame is a reference frame of the current picture block in the first direction, and the index value of the first reference frame is a number of the first reference frame in the first reference frame list; obtaining an index value of a second reference frame, determining a sequence number of the second reference frame based on the index value of the second reference frame and a second reference frame list, and determining a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list; deriving a second motion vector difference in the second motion information according to the following formula:

$$mvd\_lY = \frac{POC\_Cur - POC\_listY}{POC\_Cur - POC\_listX} \times mvd\_lX$$

where in the foregoing formula, mvd_lY represents the second motion vector difference, POC_Cur represents a sequence number of a current frame, POC_listX represents the sequence number of the first reference frame, POC_listY represents the sequence number of the second reference frame, and mvd_lX represents the first motion vector difference; and determining a second motion vector based on the second predicted motion vector and the second motion vector difference, where the second motion vector is a motion vector of the current picture block in the second direction.

In one embodiment, a method for "determining the second motion information based on the first motion information" is: obtaining an index value of a first reference frame and a first motion vector that are in the first motion information, where the first reference frame is a reference frame of the current picture block in the first direction, and the index value of the first reference frame is a number of the first reference frame in a first reference frame list; obtaining an index value of a second reference frame, and determining a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in a second reference frame list; when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, deriving a second motion vector difference in the second motion information according to the following formula:

$$mvd\_lY=-mvd\_lX$$

where in the foregoing formula, mvd_lY represents the second motion vector difference, and mvd_lX represents a first motion vector difference; and determining a second motion vector based on the second predicted motion vector and the second motion vector difference, where the second motion vector is a motion vector of the current picture block in the second direction.

Similarly, both "the first reference frame is a forward reference frame of the current picture block and the second reference frame is a backward reference frame of the current picture block" and "the first reference frame is a backward reference frame of the current picture block and the second reference frame is a forward reference frame of the current picture block" may be represented by using a formula (POC_Cur−POC_listX)*(POC_listY−POC_Cur)>0, or may be represented by using a formula POC_listY=2*POC_Cur−POC_listX. This is not specifically limited in this application.

Both "the first reference frame and the second reference frame each are a forward reference frame of the current picture block" and "the first reference frame and the second reference frame each are a backward reference frame of the current picture block" may be represented by using a formula (POC_Cur−POC_listX)*(POC_listY−POC_Cur)<0.

POC_Cur represents a sequence number of a current frame, POC_listX represents a sequence number of the first reference frame, and POC_listY represents a sequence number of the second reference frame.

It may be learned that, the bidirectional inter prediction method provided in this application may be: determining the second motion vector based on the first motion vector, or may be: determining the second motion vector difference based on the first motion vector difference, and determining the second motion vector based on the second motion vector difference.

In one embodiment, a method for "obtaining an index value of a second reference frame" is: calculating a first sequence number based on the sequence number of the current frame and the sequence number of the first reference frame according to a formula POC_listY0=2*POC_Cur−POC_listX, where POC_Cur represents the sequence number of the current frame, POC_listX represents the sequence number of the first reference frame, and POC_listY0 represents the first sequence number; and when the second reference frame list includes the first sequence number, determining, as the index value of the second reference frame, a number of a reference frame represented by the first sequence number in the second reference frame list.

In one embodiment, a method for "obtaining an index value of a second reference frame" is: calculating a second sequence number based on the sequence number of the current frame and the sequence number of the first reference frame according to a formula (POC_Cur−POC_listX)*(POC_listY0'−POC_Cur)>0, where POC_listY0' represents the second sequence number; and when the second reference frame list includes the second sequence number, determining, as the index value of the second reference frame, a number of a reference frame represented by the second sequence number in the second reference frame list.

In one embodiment, a method for "obtaining an index value of a second reference frame" is: calculating a third sequence number based on the sequence number of the current frame and the sequence number of the first reference frame according to a formula POC_listX≠POC_listY0", where POC_listY0" represents the third sequence number; and determining, as the index value of the second reference frame, a number of a reference frame represented by the third sequence number in the second reference frame list.

In one embodiment, a method for "obtaining an index value of a second reference frame" is: calculating a first sequence number based on the sequence number of the current frame and the sequence number of the first reference frame according to a formula POC_listY0=2*POC_Cur−POC_listX, where POC_Cur represents the sequence number of the current frame, POC_listX represents the sequence number of the first reference frame, and POC_listY0 represents the first sequence number. When the second reference frame list includes the first sequence number, a number of a reference frame represented by the first sequence number in the second reference frame list is determined as the index value of the second reference frame. When the second reference frame list does not include the first sequence number, a second sequence number is calculated based on the sequence number of the current frame and the sequence number of the first reference frame according to a formula (POC_Cur−POC_listX)*(POC_listY0'−POC_Cur)>0, where POC_listY0' represents the second sequence number. When the second reference frame list includes the second sequence number, a number of a reference frame represented by the second sequence number in the second reference frame list is determined as the index value of the second reference frame. When the second reference frame list does not include the second sequence number, a third sequence number is calculated based on the sequence number of the current frame and the sequence number of the first reference frame according to a formula POC_listX≠POC_listY0", where POC_listY0" represents the third sequence number; and a number of a reference frame represented by the third sequence number in the second reference frame list is determined as the index value of the second reference frame.

In one embodiment, a method for "obtaining an index value of a second reference frame" is: parsing a bitstream to obtain the index value of the second reference frame.

It may be learned that there may be a number of methods for "obtaining an index value of a second reference frame" in this application. A specific method used to obtain the index value of the second reference frame needs to be determined based on actual requirements or be preset.

According to a second aspect, a bidirectional inter prediction apparatus is provided. The bidirectional inter prediction apparatus includes an obtaining unit and a determining unit.

Specifically, the obtaining unit is configured to: obtain indication information, where the indication information is used to indicate to determine second motion information based on first motion information, the first motion information is motion information of a current picture block in a first direction, and the second motion information is motion information of the current picture block in a second direction; and obtain the first motion information. The determining unit is configured to: determine the second motion information based on the first motion information obtained by the obtaining unit, and determine prediction samples of the current picture block based on the first motion information and the second motion information.

In one embodiment, the determining unit is configured to: obtain an index value of a first reference frame in the first motion information, and determine a sequence number of the first reference frame based on the index value of the first reference frame and a first reference frame list, where the first reference frame is a reference frame of the current picture block in the first direction, and the index value of the first reference frame is a number of the first reference frame in the first reference frame list; obtain an index value of a second reference frame, and determine a sequence number of the second reference frame based on the index value of the second reference frame and a second reference frame list, where the second reference frame is a reference frame of the current picture block in the second direction, and the index value of the second reference frame is a number of the second reference frame in the second reference frame list; determine a first motion vector based on a first motion vector difference and a first motion vector predictor flag that are in the first motion information, where the first motion vector is a motion vector of the current picture block in the first direction; and derive a second motion vector in the second motion information according to the following formula:

$$mv\_lY = \frac{POC\_Cur - POC\_listY}{POC\_Cur - POC\_listX} \times mv\_lX$$

In the foregoing formula, mv_lY represents the second motion vector, POC_Cur represents a sequence number of a current frame, POC_listX represents the sequence number of the first reference frame, POC_listY represents the sequence number of the second reference frame, mv_lX represents the first motion vector, and the second motion vector is a motion vector of the current picture block in the second direction.

In one embodiment, the determining unit is configured to: obtain an index value of a first reference frame in the first motion information, where the first reference frame is a reference frame of the current picture block in the first direction, and the index value of the first reference frame is a number of the first reference frame in a first reference frame list; obtain an index value of a second reference frame, where the second reference frame is a reference frame of the current picture block in the second direction, and the index value of the second reference frame is a number of the second reference frame in a second reference frame list; determine a first motion vector based on a first motion vector difference and a first motion vector predictor flag that are in the first motion information, where the first motion vector is a motion vector of the current picture block in the first direction; and when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, derive a second motion vector in the second motion information according to the following formula:

$$mv\_lY = -mv\_lX$$

In the foregoing formula, mv_lY represents the second motion vector, mv_lX represents the first motion vector, and the second motion vector is a motion vector of the current picture block in the second direction.

In one embodiment, the determining unit is configured to: obtain an index value of a first reference frame and a first motion vector difference that are in the first motion information, and determine a sequence number of the first reference frame based on the index value of the first reference frame and a first reference frame list, where the first reference frame is a reference frame of the current picture block in the first direction, and the index value of the first reference frame is a number of the first reference frame in the first reference frame list; obtain an index value of a second reference frame, determine a sequence number of the second reference frame based on the index value of the second reference frame and a second reference frame list, and determine a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in the second reference frame list; derive a second motion vector difference in the second motion information according to the following formula:

$$mvd\_lY = \frac{POC\_Cur - POC\_listY}{POC\_Cur - POC\_listX} \times mvd\_lX$$

where mvd_lY represents the second motion vector difference, POC_Cur represents a sequence number of a current frame, POC_listX represents the sequence number of the first reference frame, POC_listY represents the sequence number of the second reference frame, and mvd_lX represents the first motion vector difference; and determine a second motion vector based on the second predicted motion vector and the second motion vector difference, where the second motion vector is a motion vector of the current picture block in the second direction.

In one embodiment, the determining unit is configured to: obtain an index value of a first reference frame and a first motion vector that are in the first motion information, where the first reference frame is a reference frame of the current picture block in the first direction, and the index value of the first reference frame is a number of the first reference frame in a first reference frame list; obtain an index value of a second reference frame, and determine a second predicted motion vector based on the index value of the second reference frame and a second candidate predicted motion vector list, where the second predicted motion vector is a predicted motion vector of the current picture block in the second direction, the second reference frame is a reference frame of the current picture block in the second direction, and the index value of the second reference frame is a number of the second reference frame in a second reference frame list; when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, derive a second motion vector difference in the second motion information according to the following formula:

$$mvd\_lY = -mvd\_lX$$

where mvd_lY represents the second motion vector difference, and mvd_lX represents a first motion vector difference; and determine a second motion vector based on the second predicted motion vector and the second motion vector difference, where the second motion vector is a motion vector of the current picture block in the second direction.

In one embodiment, the obtaining unit is configured to: calculate a first sequence number based on the sequence number of the current frame and the sequence number of the first reference frame according to a formula POC_listY0=2*POC_Cur−POC_listX, where POC_Cur represents the sequence number of the current frame, POC_listX represents the sequence number of the first reference frame, and POC_listY0 represents the first sequence number; and when the second reference frame list includes the first sequence number, determine, as the index value of the second reference frame, a number of a reference frame represented by the first sequence number in the second reference frame list.

In one embodiment, the obtaining unit is configured to: calculate a second sequence number based on the sequence number of the current frame and the sequence number of the first reference frame according to a formula (POC_Cur−POC_listX)*(POC_listY0'−POC_Cur)>0, where POC_listY0' represents the second sequence number; and when the second reference frame list includes the second sequence number, determine, as the index value of the second reference frame, a number of a reference frame represented by the second sequence number in the second reference frame list.

In one embodiment, the obtaining unit is configured to: calculate a third sequence number based on the sequence number of the current frame and the sequence number of the first reference frame according to a formula POC_listX≠POC_listY0", where POC_listY0" represents the third sequence number; and determine, as the index value of the second reference frame, a number of a reference frame represented by the third sequence number in the second reference frame list.

According to a third aspect, a bidirectional inter prediction method is provided. There are a number of embodiments for the bidirectional inter prediction method.

One embodiment is: parsing a bitstream to obtain a first identifier, where the first identifier is used to indicate whether to determine second motion information based on first motion information, the first motion information is motion information of a current picture block in a first direction, and the second motion information is motion information of the current picture block in a second direction; if a value of the first identifier is a first preset value, obtaining the first motion information, and determining the second motion information based on the first motion information; and determining prediction samples of the current picture block based on the first motion information and the second motion information.

Another embodiment is: parsing a bitstream to obtain a second identifier, where the second identifier is used to indicate whether to calculate motion information of a current picture block by using a motion information derivation algorithm; if a value of the second identifier is a second preset value, obtaining a third identifier, where the third identifier is used to indicate whether to determine second motion information based on first motion information, the first motion information is motion information of the current picture block in a first direction, and the second motion information is motion information of the current picture block in a second direction; if a value of the third identifier is a third preset value, obtaining the first motion information, and determining the second motion information based on the first motion information; and determining prediction samples of the current picture block based on the first motion information and the second operation information.

Another embodiment is: parsing a bitstream to obtain a second identifier, where the second identifier is used to indicate whether to calculate motion information of a current picture block by using a motion information derivation algorithm; if a value of the second identifier is a second preset value, obtaining first motion information, and determining second motion information based on the first motion information, where the first motion information is motion information of the current picture block in a first direction, and the second motion information is motion information of the current picture block in a second direction; and determining prediction samples of the current picture block based on the first motion information and the second motion information.

Another embodiment is: parsing a bitstream to obtain a fourth identifier, where the fourth identifier is used to indicate whether to calculate motion information of a current picture block by using a motion information derivation algorithm; if a value of the fourth identifier is a fourth preset value, determining an index value of a first reference frame and an index value of a second reference frame based on a first reference frame list and a second reference frame list, where the first reference frame list is a reference frame list of the current picture block in a first direction, the second reference frame list is a reference frame list of the current picture block in a second direction, the first reference frame is a reference frame of the current picture block in the first direction, and the second reference frame is a reference frame of the current picture block in the second direction; obtaining a first motion vector difference and a first motion vector predictor flag, and determining second motion information based on first motion information, where the first motion information includes the index value of the first reference frame, the first motion vector difference, and the first motion vector predictor flag, and the second motion information is motion information of the current picture block in the second direction; and determining prediction samples of the current picture block based on the first motion information and the second motion information.

Another embodiment is: parsing a bitstream to obtain a first identifier, where the first identifier is used to indicate whether to determine second motion information based on first motion information, the first motion information is motion information of a current picture block in a first direction, and the second motion information is motion information of the current picture block in a second direction; if a value of the first identifier is an eighth preset value, obtaining a fifth identifier, where the fifth identifier is used to indicate whether to determine the first motion information based on the second motion information; if a value of the fifth identifier is a fifth preset value, obtaining the second motion information, and determining the first motion information based on the second motion information; and determining prediction samples of the current picture block based on the first motion information and the second motion information.

Another embodiment is: parsing a bitstream to obtain a second identifier, where the second identifier is used to indicate whether to calculate motion information of a current picture block by using a motion information derivation algorithm; if a value of the second identifier is a second preset value, obtaining a third identifier, where the third identifier is used to indicate whether to determine second motion information based on first motion information, the first motion information is motion information of the current picture block in a first direction, and the second motion information is motion information of the current picture block in a second direction; if a value of the third identifier is a sixth preset value, obtaining the second motion information, and determining the first motion information based on the second motion information; and determining prediction samples of the current picture block based on the first motion information and the second operation information.

For specific descriptions of the first identifier to the fourth identifier, refer to the following descriptions.

In the bidirectional inter prediction method provided in this application, after an identifier is obtained by parsing the bitstream, whether to determine the second motion information based on the first motion information is determined based on a value of the identifier. After it is determined that the second motion information needs to be determined based on the first motion information, the first motion information is obtained, and then the second motion information is determined based on the obtained first motion information. In this way, the bitstream needs to include only the corresponding identifier and the first motion information, and no longer needs to include the second motion information. Compared with the prior art in which the bitstream includes motion information of each picture block in each direction, the bidirectional inter prediction method provided in this application effectively reduces motion information included in the bitstream, and improves effective utilization of transmission resources, a transmission rate, and a coding rate.

According to a fourth aspect, a bidirectional inter prediction apparatus is provided. The bidirectional inter prediction apparatus includes an obtaining unit and a determining unit.

In one embodiment, the obtaining unit is configured to: parse a bitstream to obtain a first identifier, where the first identifier is used to indicate whether to determine second motion information based on first motion information, the first motion information is motion information of a current picture block in a first direction, and the second motion information is motion information of the current picture block in a second direction; and if a value of the first identifier is a first preset value, obtain the first motion information. The determining unit is configured to: determine the second motion information based on the first motion information obtained by the obtaining unit, and determine prediction samples of the current picture block based on the first motion information and the second motion information.

In another embodiment, the obtaining unit is configured to: parse a bitstream to obtain a second identifier, where the second identifier is used to indicate whether to calculate motion information of a current picture block by using a motion information derivation algorithm; if a value of the second identifier is a second preset value, obtain a third identifier, where the third identifier is used to indicate whether to determine second motion information based on first motion information, the first motion information is motion information of the current picture block in a first direction, and the second motion information is motion information of the current picture block in a second direction; and if a value of the third identifier is a third preset value, obtain the first motion information. The determining unit is configured to: determine the second motion information based on the first motion information obtained by the obtaining unit, and determine prediction samples of the current picture block based on the first motion information and the second motion information.

In another embodiment, the obtaining unit is configured to: parse a bitstream to obtain a second identifier, where the second identifier is used to indicate whether to calculate motion information of a current picture block by using a motion information derivation algorithm; and if a value of the second identifier is a second preset value, obtain first motion information. The determining unit is configured to: determine second motion information based on the first motion information obtained by the obtaining unit, where the first motion information is motion information of the current picture block in a first direction, and the second motion information is motion information of the current picture block in a second direction; and determine prediction samples of the current picture block based on the first motion information and the second motion information.

In another embodiment, the obtaining unit is configured to parse a bitstream to obtain a fourth identifier, where the fourth identifier is used to indicate whether to calculate motion information of a current picture block by using a motion information derivation algorithm. The determining unit is configured to: if a value of the fourth identifier obtained by the obtaining unit is a fourth preset value, determine an index value of a first reference frame and an index value of a second reference frame based on a first reference frame list and a second reference frame list, where the first reference frame list is a reference frame list of the current picture block in a first direction, the second reference frame list is a reference frame list of the current picture block in a second direction, the first reference frame is a reference frame of the current picture block in the first direction, and the second reference frame is a reference frame of the current picture block in the second direction. The obtaining unit is further configured to obtain a first motion vector difference and a first motion vector predictor flag. The determining unit is further configured to: determine second motion information based on first motion information, where the first motion information includes the index value of the first reference frame, the first motion vector difference, and the first motion vector predictor flag, and the second motion information is motion information of the current picture block in the second direction; and determine prediction samples of the current picture block based on the first motion information and the second motion information.

According to a fifth aspect, a terminal is provided. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the bidirectional inter prediction method according to any one of the first aspect or the possible embodiments of the first aspect, or performs the bidirectional inter prediction method according to any one of the third aspect or the possible embodiments of the third aspect.

According to a sixth aspect, a video decoder is provided, including a non-volatile storage medium and a central processing unit. The non-volatile storage medium stores an executable program. The central processing unit is connected to the non-volatile storage medium, and executes the executable program to implement the bidirectional inter prediction method according to any one of the first aspect or the embodiments of the first aspect, or the bidirectional inter prediction method according to any one of the third aspect or the embodiments of the third aspect.

According to a seventh aspect, a decoder is provided. The decoder includes the bidirectional inter prediction apparatus in the second aspect and a reconstruction module, where the reconstruction module is configured to determine reconstructed sample values of a current picture block based on prediction samples obtained by the bidirectional inter prediction apparatus; or the decoder includes the bidirectional inter prediction apparatus in the fourth aspect and a reconstruction module, where the reconstruction module is configured to determine reconstructed sample values of a current picture block based on prediction samples obtained by the bidirectional inter prediction apparatus.

According to an eighth aspect, a computer-readable storage medium is provided. The computer-readable storage medium stores instructions. When the instructions are executed on the terminal in the fifth aspect, the terminal is enabled to perform the bidirectional inter prediction method according to any one of the first aspect or the possible embodiments of the first aspect, or perform the bidirectional inter prediction method according to any one of the third aspect or the possible embodiments of the third aspect.

According to a ninth aspect, a computer program product including an instruction is provided. When the computer program product runs on the terminal in the fifth aspect, the terminal is enabled to perform the bidirectional inter prediction method according to any one of the first aspect or the possible embodiments of the first aspect, or perform the bidirectional inter prediction method according to any one of the third aspect or the possible embodiments of the third aspect.

In this application, a name of the bidirectional inter prediction apparatus imposes no limitation on devices or functional modules. In actual implementation, the devices or the functional modules may have other names. Provided that functions of the devices or the functional modules are similar to those in this application, the devices or the functional modules fall within the scope of the claims in this application and equivalent technologies thereof.

For specific descriptions of the fifth aspect to the ninth aspect and embodiments of the fifth aspect to the ninth aspect, refer to the detailed descriptions of the first aspect and the embodiments of the first aspect or the detailed descriptions of the third aspect and the embodiments of the third aspect. In addition, for beneficial effects of the fifth aspect to the ninth aspect and the embodiments of the fifth aspect to the ninth aspect, refer to analysis of the beneficial effects of the first aspect and the embodiments of the first aspect or analysis of the beneficial effects of the third aspect and the embodiments of the third aspect. Details are not described herein again.

These aspects or other aspects in this application are more concise and comprehensible in the following description.

DESCRIPTION OF EMBODIMENTS

Figure 1:
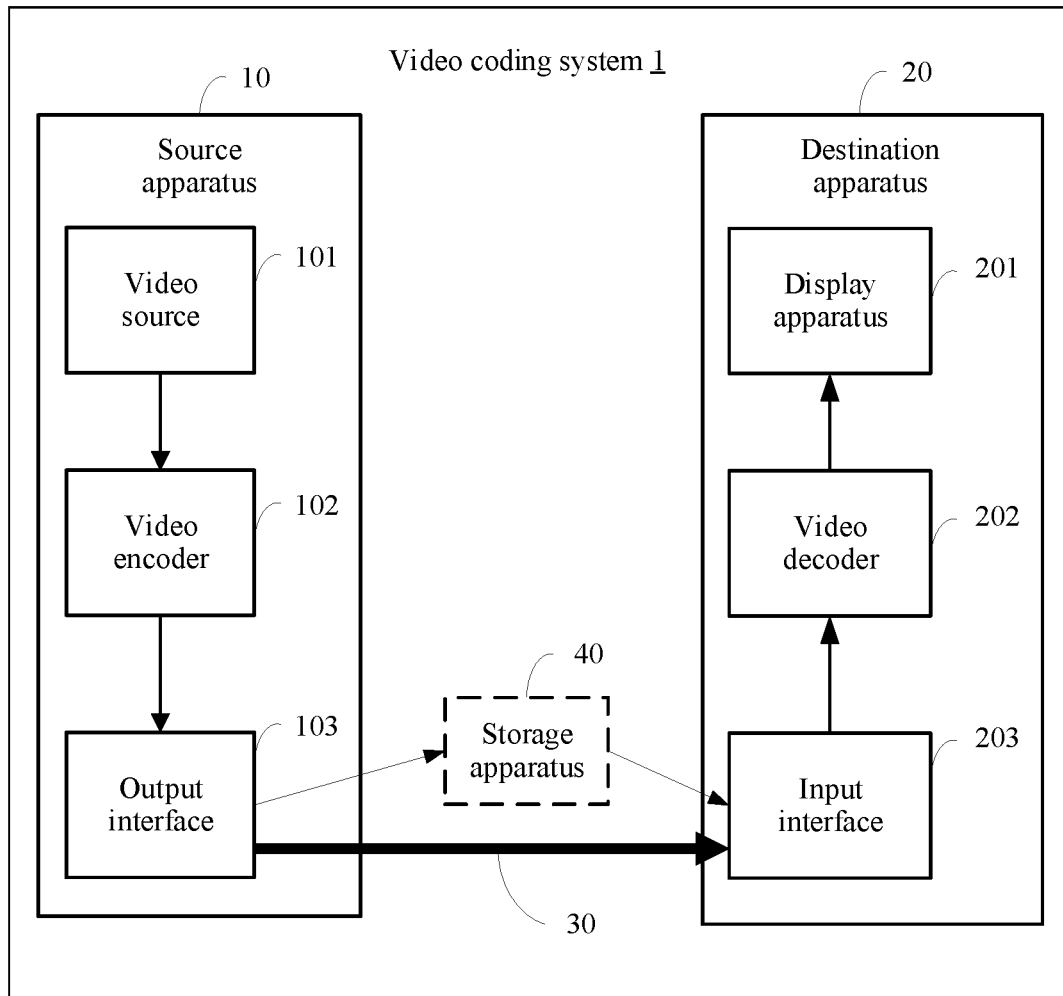
FIG. 1 is a schematic structural diagram of a video coding system according to an embodiment.

In the specification, claims, and accompanying drawings of this application, the terms "first", "second", "third", "fourth" and so on are intended to distinguish between different objects but do not indicate a particular order.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example" or "for example" or the like is intended to present a related concept in a specific manner.

To facilitate understanding of the embodiments of this application, related elements in the embodiments of this application are first described herein.

Picture encoding: a process of compressing a picture sequence into a bitstream.

Picture decoding: a process of restoring the bitstream to a reconstructed picture according to a specific syntax rule and a specific processing method.

Currently, a video picture encoding process is as follows: An encoder first splits a frame of original picture into a number of parts that do not overlap each other, where each part may be used as a picture block. Then, the encoder performs operations such as prediction, transform, and quantization on each picture block, to obtain a bitstream corresponding to the picture block, where prediction is performed to obtain a prediction block of the picture block, so that only a difference (or referred to as a residual or a residual block) between the picture block and the prediction block of the picture block may be encoded and transmitted, to reduce transmission overheads. Finally, the encoder sends the bitstream corresponding to the picture block to a decoder.

Correspondingly, after receiving the bitstream, the decoder performs a video decoding process. Specifically, the decoder performs operations such as prediction, inverse quantization, and inverse transform on the received bitstream to obtain a reconstructed picture block (or referred to as a picture block after reconstruction). This process is referred to as a picture reconstruction process (or a picture reconstruction process). Then, the decoder assembles a reconstructed block of each picture block in the original picture to obtain a reconstructed picture of the original picture, and plays the reconstructed picture.

An existing video picture coding technology includes intra prediction and inter prediction. Inter prediction is prediction completed by coding picture block/decoding picture block by using a correlation between a current frame and a reference frame of the current frame. The current frame may have one or more reference frames. Specifically, a prediction picture block of a current picture block is generated based on samples in a reference frame of the current picture block.

Generally, the prediction picture block of the current picture block may be generated based on only one reference picture block, or the prediction picture block of the current picture block may be generated based on at least two reference picture blocks. The generation of the prediction picture block of the current picture block based on one reference picture block is referred to as unidirectional prediction, and the generation of the prediction picture block of the current picture block based on at least two reference picture blocks is referred to as bidirectional inter prediction. Those two or more reference picture blocks in bidirectional inter prediction may be from a same reference frame or different reference frames. In other words, a "direction" in this application is a generalized definition. One direction in this application corresponds to one reference picture block. The following first direction and second direction correspond to different reference picture blocks. The two reference picture blocks may be included in a forward reference frame/backward reference frame of the current picture block; or one reference picture block may be included in a forward reference frame of the current picture block, and the other reference picture block may be included in a backward reference frame of the current picture block.

In one embodiment, bidirectional inter prediction may be inter prediction performed by using a correlation between a current video frame and a video frame that is encoded and played before the current video frame and a correlation between the current video frame and a video frame that is encoded before the current video frame and played after the current video frame.

It can be learned that bidirectional inter prediction includes inter prediction in two directions that is usually referred to as forward inter prediction and backward inter prediction. Forward inter prediction is inter prediction performed by using the correlation between the current video frame and the video frame that is encoded and played before the current video frame. Backward inter prediction is inter prediction performed by using the correlation between the current video frame and the video frame that is encoded before the current video frame and played after the current video frame.

Forward inter prediction corresponds to a forward reference frame list L0, and backward inter prediction corresponds to a backward reference frame list L1. The two reference frame lists may include a same quantity of reference frames or different quantities of reference frames.

Motion compensation (MC) is a process of predicting the current picture block by using a reference picture block.

In most encoding frameworks, a video sequence includes a series of pictures, a picture is split into at least one slice, and each slice is further split into picture blocks. Video encoding/decoding is performed by picture block. Encoding/decoding processing may be performed from left to right and from top to bottom row by row starting from an upper-left corner position of the picture. Herein, the picture block may be a macro block (MB) in a video coding standard H.264, or may be a coding unit (CU) in a high efficiency video coding (HEVC) standard. This is not specifically limited in the embodiments of this application.

In this application, a picture block that is being encoded/decoded is referred to as the current picture block (or current block), and a picture in which the current picture block is located is referred to as the current frame.

Generally, the current frame may be a unidirectional prediction frame (P frame), or may be a bidirectional prediction frame (B frame). When the current frame is the P frame, the current frame has one reference frame list. When the current frame is the B frame, the current frame has two reference frame lists, and the two lists are usually referred to as L0 and L1 respectively. Each reference frame list includes at least one reconstructed frame that is used as the reference frame of the current frame. The reference frame is used to provide a reference sample for inter prediction of the current frame.

In the current frame, a neighboring picture block (for example, on the left, upper, or right side of the current block) of the current picture block may have been encoded/decoded, and a reconstructed picture is obtained. The neighboring picture block is referred to as the reconstructed picture block. Information such as a coding mode and a reconstructed sample of the reconstructed picture block is available.

A frame that has been encoded/decoded before the current frame is encoded/decoded is referred to as a reconstructed frame.

A motion vector (MV) is an important parameter in an inter prediction process, and represents a spatial displacement of an encoded picture block relative to the current picture block. Usually, the motion vector may be obtained by using a motion estimation (ME) method such as motion search. In a preliminary inter prediction technology, the encoder transmits a motion vector of the current picture block in the bitstream, so that the decoder reproduces prediction samples of the current picture block, to obtain a reconstructed block. To further improve encoding efficiency, a method for differentially encoding the motion vector by using a reference motion vector is provided later, to be specific, only a motion vector difference (MVD) is encoded.

To enable the decoder and the encoder to use a same reference picture block, the encoder needs to send motion information of each picture block to the decoder in the bitstream. If the encoder directly encodes a motion vector of each picture block, a large quantity of transmission resources are consumed. Because motion vectors of spatially neighboring picture blocks are strongly correlated, the motion vector of the current picture block can be predicted based on a motion vector of an encoded neighboring picture block. A motion vector obtained through prediction is referred to as an MVP, and a difference between the motion vector of the current picture block and the MVP is referred to as the MVD.

In the video coding standard H.264, multi-reference frame prediction is used in a motion estimation process to improve prediction precision. To be specific, a buffer storing a number of reconstructed frames is created, and all the reconstructed frames in the buffer are searched for an optimal reference picture block for motion compensation, to better remove temporal redundancy. In the video coding standard H.264, two buffers are used in inter prediction: a reference frame list 0 (also referred to as reference list 0) and a reference frame list 1 (also referred to as reference list 1). A reference frame in which an optimal reference block in each list is located is marked with an index value, namely, ref_idx_l0 and ref_idx_l1. In each reference frame list, motion information of a reference picture block includes a reference frame index value (ref_idx_l0 or ref_idx_l1), an MVP flag, and an MVD. The decoder may find a correct reference picture block in a selected reference frame based on the reference frame index value, the MVP flag, and the MVD.

Currently, inter prediction modes frequently used in the HEVC standard are an advanced motion vector prediction (AMVP) mode, a merge mode, and a non-translational motion model prediction mode.

In the AMVP mode, the encoder constructs a candidate motion vector list by using a motion vector of an encoded picture block that is spatially or temporarily adjacent to the current picture block, and determines an optimal motion vector in the candidate motion vector list as the MVP of the current picture block based on a rate-distortion cost. In addition, the encoder performs motion search in a neighborhood centered on the MVP to obtain the motion vector of the current picture block. The encoder transmits an index value (namely, the MVP flag) of the MVP in the candidate motion vector list, the reference frame index value, and the MVD to the decoder.

In the merge mode, the encoder constructs a candidate motion information list by using motion information of the encoded picture block that is spatially or temporarily adjacent to the current picture block, and determines optimal motion information in the candidate motion information list as motion information of the current picture block based on the rate-distortion cost. The encoder transmits an index value of a position of the optimal motion information in the candidate motion information list to the decoder.

In the non-translational motion model prediction mode, the encoder and the decoder derive motion information of all subblocks of the current picture block by using a same motion model, and perform motion compensation based on the motion information of all the subblocks to obtain the prediction picture block. This improves prediction efficiency. A motion model frequently used by the encoder and the decoder is a 4-parameter affine model, a 6-parameter affine transform model, or an 8-parameter bilinear model.

For example, the 4-parameter affine transform model may be represented by using motion vectors of two samples and coordinates of the two samples relative to a sample in the top-left corner of the current picture block. Herein, a sample used to represent a motion model parameter is referred to as a control point. If the sample in the top-left corner (0, 0) of the current picture block and a sample in the top-right corner (W, 0) of the current picture block are control points, and motion vectors of the samples in the top-left corner and the top-right corner of the current picture block are $(vx_0, vy_0)$ and $(vx_1, vy_1)$ respectively, motion information of each subblock of the current picture block is obtained according to the following formula (1). In the following formula (1), (x, y) is coordinates of the subblock relative to the sample in the top-left corner of the current picture block, (vx, vy) is a motion vector of the subblock, and W is the width of the current picture block.

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (1)$$

For example, the 6-parameter affine transform model may be represented by using motion vectors of three samples and coordinates of the three samples relative to the sample in the top-left corner of the current picture block. If the sample in the top-left corner (0, 0) of the current picture block, the sample in the top-right corner (W, 0) of the current picture block, and a sample in the bottom-left corner (0, H) of the current picture block are control points, and motion vectors of the samples in the top-left corner, the top-right corner, and the bottom-left corner of the current picture block are $(vx_0, vy_0)$, $(vx_1, vy_1)$, and $(vx_2, vy_2)$ respectively, the motion information of each subblock of the current picture block is obtained according to the following formula (2). In the following formula (2), (x, y) is the coordinates of the subblock relative to the sample in the top-left corner of the current picture block, (vx, vy) is the motion vector of the subblock, W and H are the width and the height of the current picture block respectively.

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (2)$$

For example, the 8-parameter bilinear model may be represented by using motion vectors of four samples and coordinates of the four samples relative to the sample in the top-left corner of the current picture block. If the sample in the top-left corner (0, 0) of the current picture block, the sample in the top-right corner (W, 0) of the current picture block, the sample in the bottom-left corner (0, H) of the current picture block, and a sample in the bottom-right corner (W, H) of the current picture block are control points, and motion vectors of the samples in the top-left corner, the top-right corner, the bottom-left corner, and the bottom-right corner of the current picture block are $(vx_0, vy_0)$, $(vx_1, vy_1)$, $(vx_2, vy_2)$, and $(vx_3, vy_3)$ respectively, the motion information of each subblock of the current picture block is obtained according to the following formula (3). In the following formula (3), (x, y) is the coordinates of the subblock relative to the sample in the top-left corner of the current picture block, (vx, vy) is the motion vector of the subblock, and W and H are the width and the height of the current picture block respectively.

$$\begin{cases} v_x = \frac{v_{1x} - v_{0x}}{W}x + \frac{v_{2x} - v_{0x}}{H}y + \frac{v_{3x} + v_{0x} - v_{1x} - v_{2x}}{WH}xy + v_{0x} \\ v_y = \frac{v_{1y} - v_{0y}}{W}x + \frac{v_{2y} - v_{0y}}{H}y + \frac{v_{3y} + v_{0y} - v_{1y} - v_{2y}}{WH}xy + v_{0y} \end{cases} \quad (3)$$

It can be easily learned that, in any one of the foregoing inter prediction modes, if inter prediction is bidirectional inter prediction, the encoder needs to send motion information of each picture block in each direction to the decoder. Consequently, the motion information occupies a relatively large quantity of transmission resources. This reduces effective utilization of transmission resources, a transmission rate, and coding compression efficiency.

To resolve the foregoing problem, this application provides a bidirectional inter prediction method. In bidirectional inter prediction, an encoder sends motion information of a current picture block in a first direction to a decoder, and after receiving the motion information of the current picture block in the first direction, the decoder calculates motion information of the current picture block in a second direction based on the motion information of the current picture block in the first direction. In this way, prediction samples of the current picture block may be calculated based on the motion information of the current picture block in the first direction and the motion information of the current picture block in the second direction.

The bidirectional inter prediction method provided in this application may be performed by a bidirectional inter prediction apparatus, a video coding apparatus, a video codec, or another device having a video coding function.

The bidirectional inter prediction method provided in this application is applicable to a video coding system. In the video coding system, a video encoder 100 and a video decoder 200 are configured to calculate motion information of a current picture block according to examples of the bidirectional inter prediction method provided in this application. In one embodiment, motion information of the current picture block in a second direction is calculated based on motion information of the current picture block in a first direction, so that prediction samples of the current picture block are determined based on the motion information of the current picture block in the first direction and the motion information of the current picture block in the second direction. In this way, only the motion information of the current picture block in the first direction needs to be transmitted between the video encoder 100 and the video encoder 200. This effectively improves transmission resource utilization and coding compression efficiency.

FIG. 1 shows a structure of a video coding system according to an embodiment. As shown in FIG. 1, video coding system 1 includes a source apparatus 10 and a destination apparatus 20. The source apparatus 10 generates encoded video data. The source apparatus 10 may also be referred to as a video encoding apparatus or a video encoding device. The destination apparatus 20 may decode the encoded video data generated by the source apparatus 10.

The destination apparatus 20 may also be referred to as a video decoding apparatus or a video decoding device. The source apparatus 10 and/or the destination apparatus 20 may include at least one processor and a memory coupled to the at least one processor. The memory may include but is not limited to a read-only memory (ROM), a random access memory (RAM), an electrically erasable programmable read-only memory (EEPROM), a flash memory, or any other medium that may be configured to store required program code in a form of instructions or a data structure that can be accessed by a computer. This is not specifically limited in this application.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, a vehicle-mounted computer, or a similar apparatus.

The destination apparatus 20 may receive the encoded video data from the source apparatus 10 over a link 30. The link 30 may include one or more media and/or apparatuses that can transfer the encoded video data from the source apparatus 10 to the destination apparatus 20. In one embodiment, the link 30 may include one or more communications media that enable the source apparatus 10 to directly transmit the encoded video data to the destination apparatus 20 in real time. In this embodiment, the source apparatus 10 may modulate the encoded video data according to a communications standard (for example, a wireless communications protocol), and may transmit modulated video data to the destination apparatus 20. The one or more communications media may include wireless and/or wired communications media, for example, a radio frequency (RF) spectrum, or one or more physical transmission cables. The one or more communications media may constitute a part of a packet-based network, and the packet-based network is, for example, a local area network, a wide area network, or a global network (for example, the internet). The one or more communications media may include a router, a switch, a base station, or another device implementing communication from the source apparatus 10 to the destination apparatus 20.

In another embodiment, the encoded video data may be output to a storage apparatus 40 through an output interface 140. Similarly, the encoded video data may be accessed from the storage apparatus 40 through an input interface 240. The storage apparatus 40 may include a number of types of locally accessible data storage media such as a Blu-ray disc, a high-density digital video disc (DVD), a compact disc read-only memory (CD-ROM), a flash memory, or another appropriate digital storage medium configured to store the encoded video data.

In another embodiment, the storage apparatus 40 may correspond to a file server, or another intermediate storage apparatus storing the encoded video data generated by the source apparatus 10. In this embodiment, the destination apparatus 20 may obtain stored video data from the storage apparatus 40 through streaming transmission or downloading. The file server may be any type of server that can store the encoded video data and transmit the encoded video data to the destination apparatus 20. For example, the file server may include a world wild web server (for example, used for a website), a file transfer protocol (FTP) server, a network attached storage (NAS) apparatus, and a local disk drive.

The destination apparatus 20 may access the encoded video data through any standard data connection (for example, an internet connection). An example type of the data connection includes a wireless channel or a wired connection (for example, a cable modem) that is suitable for accessing the encoded video data stored in the file server, or a combination thereof. The encoded video data may be transmitted from the file server in a streaming manner, through downloading, or through a combination thereof.

The bidirectional inter prediction method in this application is not limited to a wireless application scenario. For example, the bidirectional inter prediction method in this application may be applied to video coding for supporting a number of multimedia applications such as the following applications: over-the-air television broadcasting, cable television transmission, satellite television transmission, streaming video transmission (for example, through the internet), encoding of video data stored in a data storage medium, decoding of video data stored in a data storage medium, or another application. In some embodiments, the video coding system 1 may be configured to support unidirectional or bidirectional video transmission, to support applications such as streaming video transmission, video playing, video broadcasting, and/or videotelephony.

It should be noted that the video coding system 1 shown in FIG. 1 is merely an example of the video coding system, and does not limit the video coding system in this application. The bidirectional inter prediction method provided in this application may be further applicable to a scenario in which there is no data communication between an encoding apparatus and a decoding apparatus. In other embodiments, to-be-encoded video data or the encoded video data may be retrieved from a local memory, or may be transmitted in the streaming manner on a network, or the like. The video encoding apparatus may encode the to-be-encoded video data and store the encoded video data into the memory. The video decoding apparatus may also obtain the encoded video data from the memory and decode the encoded video data.

In FIG. 1, the source apparatus 10 includes a video source 101, a video encoder 102, and an output interface 103. In some embodiments, the output interface 103 may include a regulator/demodulator (e.g., modem) and/or a transmitter. The video source 101 may include a video capture apparatus (for example, a camera), a video archive including previously captured video data, a video input interface for receiving video data from a video content provider, and/or a computer graphics system for generating video data, or a combination of the foregoing video data sources.

The video encoder 102 may encode video data that is from the video source 101. In some embodiments, the source apparatus 10 directly transmits the encoded video data to the destination apparatus 20 through the output interface 103. In other embodiments, the encoded video data may be alternatively stored into the storage apparatus 40, so that the destination apparatus 20 subsequently accesses the encoded video data for decoding and/or playing.

In the embodiment in FIG. 1, the destination apparatus 20 includes a display apparatus 201, a video decoder 202, and an input interface 203. In some embodiments, the input interface 203 includes a receiver and/or a modem. The input interface 203 may receive the encoded video data over the link 30 and/or from the storage apparatus 40. The display apparatus 201 may be integrated with the destination apparatus 20 or may be disposed outside the destination apparatus 20. Usually, the display apparatus 201 displays decoded video data. The display apparatus 201 may include a number of types of display apparatuses, for example, a liquid crystal display, a plasma display, an organic light-emitting diode display, or a display apparatus of another type.

In one embodiment, the video encoder 102 and the video decoder 202 may be respectively integrated with an audio encoder and an audio decoder, and may include an appropriate multiplexer-demultiplexer unit or other hardware and software, to encode both an audio and a video in a common data stream or separate data streams.

The video encoder 102 and the video decoder 202 may include at least one microprocessor, a digital signal processor (DSP), an application-specific integrated circuit (ASIC), a field programmable gate array (FPGA), discrete logic, hardware, or any combination thereof. If the bidirectional inter prediction method provided in this application is implemented by using software, an instruction used for the software may be stored in an appropriate non-volatile computer-readable storage medium, and at least one processor may be used to execute the instruction in the hardware to implement this application. Any one of the foregoing content (including the hardware, the software, a combination of the hardware and the software, and the like) may be considered as the at least one processor. The video encoder 102 may be included in an encoder, the video decoder 202 may be included in a decoder, and the encoder or the decoder may be a part of a combined encoder/decoder (e.g., codec) in a corresponding apparatus.

The video encoder 102 and the video decoder 202 in this application may perform operations according to a video compression standard (for example, HEVC), or may perform operations according to another industry standard. This is not specifically limited in this application.

The video encoder 102 is configured to: perform bidirectional motion estimation on a current picture block, to determine motion information of the current picture block in a first direction, and calculate motion information of the current picture block in a second direction based on the motion information of the current picture block in the first direction. In this way, the video encoder 102 determines a prediction picture block of the current picture block based on the motion information of the current picture block in the first direction and the motion information of the current picture block in the second direction. Further, the video encoder 102 performs operations such as transform and quantization on a residual between the current picture block and the prediction picture block of the current picture block, to generate a bitstream, and sends the bitstream to the video decoder 202. The bitstream includes the motion information of the current picture block in the first direction and indication information that is used to indicate to determine the second motion information based on the first motion information. The indication information may be represented by using different identifiers. For a method for representing the indication information, refer to the following descriptions.

In one embodiment, a method used by the video encoder 102 to calculate the motion information of the current picture block in the second direction based on the motion information of the current picture block in the first direction may be: The video encoder 102 determines a motion vector of the current picture block in the second direction based on a motion vector of the current picture block in the first direction; or the video encoder 102 determines a motion vector difference of the current picture block in the second direction based on a motion vector difference of the current picture block in the first direction, and determines a motion vector of the current picture block in the second direction based on the motion vector difference of the current picture block in the second direction and a predicted motion vector of the current picture block in the second direction.

Figure 4:
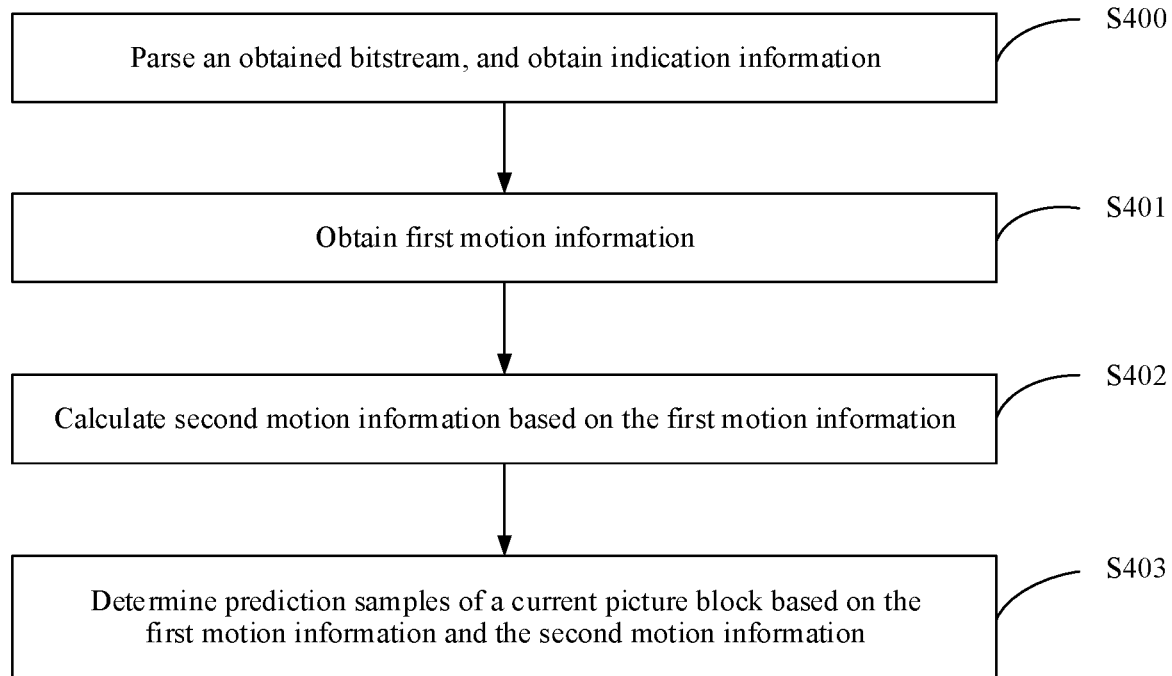
FIG. 4 is a schematic flowchart of a bidirectional inter prediction method according to an embodiment.

Referring to the following FIG. 4, video decoder 202 is configured to: obtain the bitstream, and parse the bitstream to obtain the indication information used to indicate to determine the second motion information based on the first motion information (S400), in other words, to determine to derive and calculate, based on motion information in a direction, motion information in another direction, where the first motion information is motion information of the current picture block in the first direction, the second motion information is motion information of the current picture block in the second direction, and the first direction and the second direction herein are different; obtain the first motion information (S401); determine the second motion information based on the obtained first motion information (S402); and determine prediction samples of the current picture block based on the first motion information and the second motion information (S403).

A method used by the video decoder 202 to calculate the motion information of the current picture block in the second direction based on the motion information of the current picture block in the first direction may be: The video decoder 202 determines the motion vector of the current picture block in the second direction based on the motion vector of the current picture block in the first direction; or the video decoder 202 determines the motion vector difference of the current picture block in the second direction based on the motion vector difference of the current picture block in the first direction, and determines the motion vector of the current picture block in the second direction based on the motion vector difference of the current picture block in the second direction and the predicted motion vector of the current picture block in the second direction.

Figure 2:
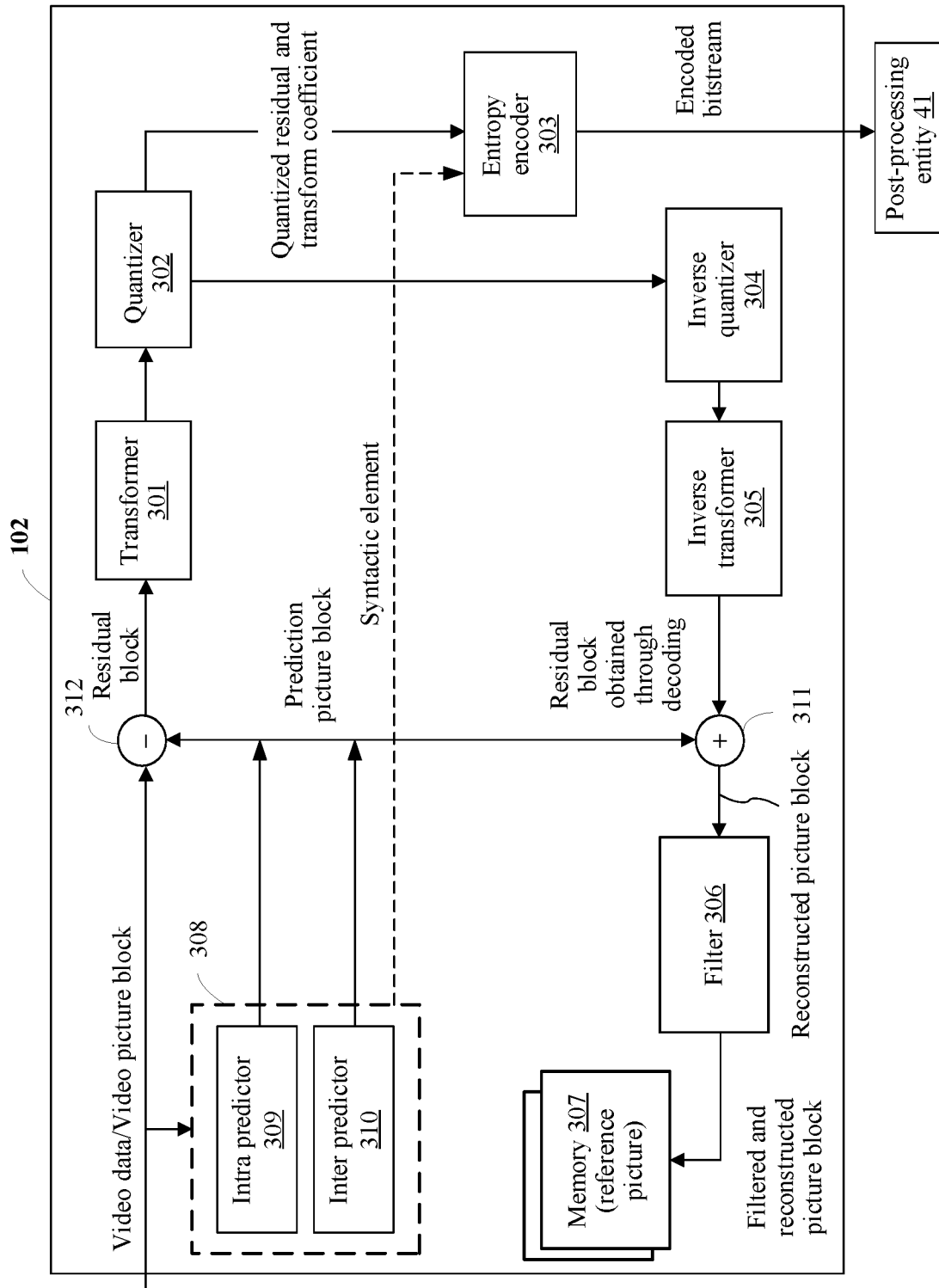
FIG. 2 is a schematic structural diagram of a video encoder according to an embodiment.

FIG. 2 is a schematic structural diagram of a video encoder according to an embodiment. As shown in FIG. 2, video encoder 102 is configured to output a video to a post-processing entity 41. The post-processing entity 41 represents an example of a video entity capable of processing the encoded video data that is from the video encoder 102, for example, a media aware network element (MANE) or a splicing apparatus/an editing apparatus. In some cases, the post-processing entity 41 may be an example of a network entity. In some video encoding systems, the post-processing entity 41 and the video encoder 102 may be components of separate apparatuses. In other cases, functions described with respect to the post-processing entity 41 may be performed by a same apparatus including the video encoder 102. In one embodiment, the post-processing entity 41 is an example of the storage apparatus 40 in FIG. 1.

The video encoder 102 may derive and calculate the motion information of the current picture block in the second direction based on the motion information of the current picture block in the first direction, and further determine the prediction picture block of the current picture block based on the motion information of the current picture block in the first direction and the motion information of the current picture block in the second direction, to further complete bidirectional inter predictive encoding.

As shown in FIG. 2, the video encoder 102 includes a transformer 301, a quantizer 302, an entropy encoder 303, a filter 306, a memory 307, a prediction processing unit 308, and a summator 312. The prediction processing unit 308 includes an intra predictor 309 and an inter predictor 310. To reconstruct a picture block, the video encoder 102 further includes an inverse quantizer 304, an inverse transformer 305, and a summator 311. The filter 306 is specified to represent one or more loop filters, for example, a deblocking filter, an adaptive loop filter, and a sample adaptive offset filter.

The memory 307 may store video data encoded by a component of the video encoder 102. The video data stored in the memory 307 may be obtained from the video source 101. The memory 307 may be a reference picture memory that stores reference video data used by the video encoder 102 to encode the video data in an intra or inter coding mode. The memory 307 may be a dynamic random access memory (DRAM) including a synchronous DRAM (SDRAM), a magnetoresistive RAM (MRAM), a resistive RAM (RRAM), or a memory apparatus of another type.

The video encoder 102 receives video data and stores the video data into a video data memory. A partitioning unit partitions the video data into several picture blocks, and these picture blocks may be further partitioned into smaller blocks, for example, picture block partitioning based on a quadtree structure or a binary-tree structure. The partitioning may further include partitioning into slices, tiles, or other larger units. The video encoder 102 is usually a component for encoding a picture block in a to-be-encoded video slice. The slice may be partitioned into a number of picture blocks (and may be partitioned into picture block sets that are referred to as the tiles).

The intra predictor 309 in the prediction processing unit 308 may perform intra predictive encoding on the current picture block relative to one or more neighboring picture blocks in a frame or slice that is the same as that of the current picture block, to remove spatial redundancy. The inter predictor 310 in the prediction processing unit 308 may perform inter predictive encoding on the current picture block relative to one or more prediction picture blocks in one or more reference pictures, to remove temporal redundancy.

The prediction processing unit 308 may provide obtained intra-coded and inter-coded picture blocks for the summator 310 to generate a residual block, and provide the residual block for the summator 309 to reconstruct an encoded block used as a reference picture.

After the prediction processing unit 308 generates the prediction picture block of the current picture block through inter prediction and intra prediction, the video encoder 102 generates the residual picture block by subtracting the prediction picture block from the to-be-encoded current picture block. The summator 312 represents one or more components that perform this subtraction operation. Residual video data in the residual block may be included in one or more transform units (TUs), and applied to the transformer 301. The transformer 301 transforms the residual video data into a residual transform coefficient through transform such as discrete cosine transform (DCT) or conceptually similar transform. The transformer 301 may convert the residual video data from a sample value domain to a transform domain, for example, a frequency domain.

The transformer 301 may send the obtained transform coefficient to the quantizer 302. The quantizer 302 quantizes the transform coefficient to further reduce a bit rate. In some embodiments, the quantizer 302 may further scan a matrix including a quantized transform coefficient. Alternatively, the entropy encoder 303 may perform scanning.

After quantization, the entropy encoder 303 performs entropy coding on the quantized transform coefficient. For example, the entropy encoder 303 may perform context-adaptive variable-length coding (CAVLC), context-adaptive binary arithmetic coding (CABAC), or another entropy coding method or technology. After the entropy encoder 303 performs entropy coding, an encoded bitstream may be sent to the video decoder 202, or may be archived for subsequent sending or subsequent retrieval by the video decoder 202. The entropy encoder 303 may further perform entropy coding on a syntactic element of the to-be-encoded current picture block.

The inverse quantizer 304 and the inverse transformer 305 respectively perform inverse quantization and inverse transform, to reconstruct the residual block in the sample domain, for example, to be subsequently used as a reference block of the reference picture. The summator 311 adds a reconstructed residual block to the prediction picture block generated by the inter predictor 310 or the intra predictor 309, to generate a reconstructed picture block. A prediction picture block of a picture block can be obtained by processing (such as interpolating) a reference picture block of the picture block.

It should be understood that other structural variants of the video encoder 102 may be used to encode a video stream. For example, for some picture blocks or picture frames, the video encoder 102 may directly quantize a residual signal, and correspondingly, processing by the transformer 301 and by the inverse transformer 305 is not required. Alternatively, for some picture blocks or picture frames, the video encoder 102 does not generate residual data, and correspondingly, processing by the transformer 301, the quantizer 302, the inverse quantizer 304, and the inverse transformer 305 is not required. Alternatively, the video encoder 102 may directly store the reconstructed picture block as the reference block, and processing by the filter 306 is not required. Alternatively, the quantizer 302 and the inverse quantizer 304 in the video encoder 102 may be combined.

Figure 3:
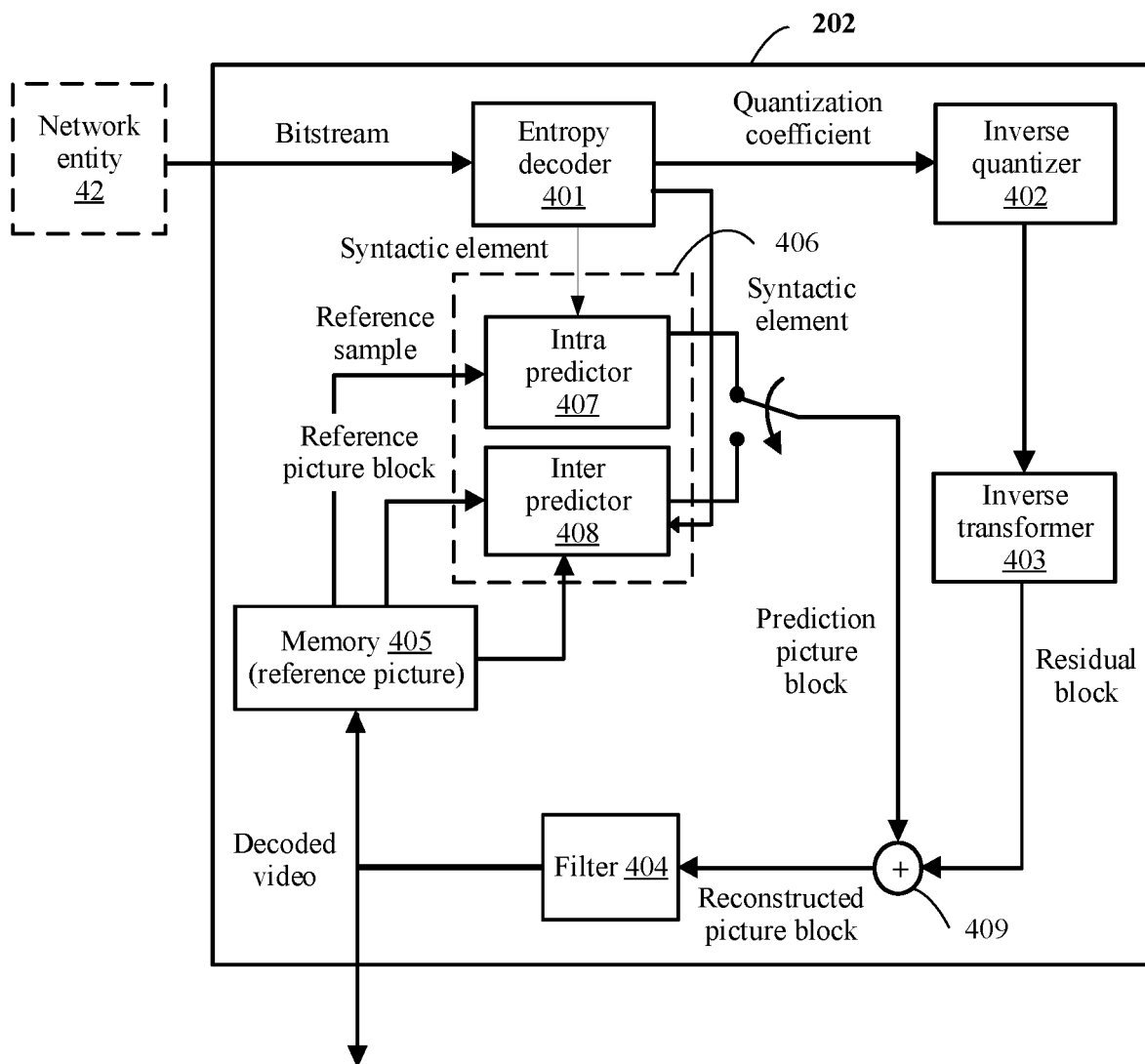
FIG. 3 is a schematic structural diagram of a video decoder according to an embodiment.

FIG. 3 is a schematic structural diagram of a video decoder according to an embodiment. As shown in FIG. 3, video decoder 202 includes an entropy decoder 401, an inverse quantizer 402, an inverse transformer 403, a filter 404, a memory 405, a prediction processing unit 406, and a summator 409. The prediction processing unit 406 includes an intra predictor 407 and an inter predictor 408. In some embodiments, the video decoder 202 may perform a decoding process that is roughly inverse to the encoding process described with respect to the video encoder 102 in FIG. 2.

In the decoding process, the video decoder 202 receives the bitstream from the video encoder 102. The video decoder 202 may receive video data from a network entity 42, and in one embodiment, may further store the video data into a video data memory (which is not shown in the figure). The video data memory may store video data that is to be decoded by a component of the video decoder 202, for example, the encoded bitstream. The video data stored in the video data memory may be obtained from, for example, a local video source such as the storage apparatus 40 or a camera through wired or wireless network communication, or by accessing a physical data storage medium. Although the video data memory is not shown in FIG. 3, the video data memory and the memory 405 may be a same memory, or may be separately configured memories. The video data memory and the memory 405 each may be constituted by any one of a number of types of memory apparatuses, for example, a dynamic random access memory (DRAM) including a synchronous DRAM (SDRAM), a magnetoresistive RAM (MRAM), a resistive RAM (RRAM), or a memory apparatus of another type. In various examples, the video data memory may be integrated onto a chip together with other components of the video decoder 202, or may be disposed outside the chip relative to those components.

The network entity 42 may be, for example, a server, a MANE, a video editor/splicer, or another similar apparatus configured to implement one or more of the technologies described above. The network entity 42 may or may not include a video encoder, for example, the video encoder 102. Before the network entity 42 sends the bitstream to the video decoder 202, the network entity 42 may implement a part of the technologies described in this application. In some video decoding systems, the network entity 42 and the video decoder 202 may be components of separate apparatuses. In other cases, functions described with respect to the network entity 42 may be performed by a same apparatus including the video decoder 202. In some cases, the network entity 42 may be an example of the storage apparatus 40 in FIG. 1.

The entropy decoder 401 of the video decoder 202 performs entropy decoding on the bitstream to generate a quantized coefficient and some syntactic elements. The entropy decoder 401 forwards the syntactic elements to the filter 404. The video decoder 202 may receive syntactic elements/a syntactic element at a video slice level and/or a picture block level. In one embodiment, the syntactic element herein may include indication information related to the current picture block, and the indication information is used to indicate to determine the second motion information based on the first motion information. In addition, in some embodiments, the video encoder 102 may send a signal to notify a specific syntactic element indicating whether to determine the second motion information based on the first motion information.

The inverse quantizer 402 performs inverse quantization on, in other words, dequantizes, the quantized transform coefficient provided in the bitstream and decoded by the entropy decoder 401. An inverse quantization process may include: determining a to-be-applied quantization degree by using a quantization parameter calculated by the video encoder 102 for each picture block in the video slice, and similarly determining a to-be-applied inverse quantization degree. The inverse transformer 403 performs inverse transform, for example, inverse DCT, inverse integer transform, or a conceptually similar inverse transform process, on the transform coefficient to generate a sample-domain residual block.

After the prediction processing unit 406 generates the prediction picture block for the current picture block or a prediction picture block for a subblock of the current picture block, the video decoder 202 sums the residual block from the inverse transformer 403 and the corresponding prediction picture block generated by the prediction processing unit 406, to obtain a reconstructed block, in other words, a decoded picture block. The summator 409 (which is also referred to as a reconstructor 409) represents a component that performs this summation operation. When necessary, a filter (in a decoding loop or after a decoding loop) may be further used to smoothen samples, or video quality may be improved in another manner. The filter 404 may be one or more loop filters, for example, a deblocking filter, an adaptive loop filter (ALF), and a sample adaptive offset (SAO) filter.

It should be understood that other structural variants of the video decoder 202 may be used to decode the bitstream. For example, for some picture blocks or picture frames, the entropy decoder 401 of the video decoder 202 does not obtain the quantized coefficient through decoding, and correspondingly, processing by the inverse quantizer 402 and the inverse transformer 403 is not required. For example, the inverse quantizer 402 and the inverse transformer 403 in the video decoder 202 may be combined.

Based on the video coding system 1 shown in FIG. 1, the video encoder 102 shown in FIG. 2, and the video decoder 202 shown in FIG. 3, the following describes in detail the bidirectional inter prediction method provided in this application.

FIG. 4 is a schematic flowchart of a bidirectional inter prediction method according to an embodiment. The method shown in FIG. 4 is performed by a bidirectional inter prediction apparatus. The bidirectional inter prediction apparatus may be the video decoder 202 in FIG. 1. FIG. 4 is described by using an example in which the bidirectional inter prediction apparatus is the video decoder 202.

As shown in FIG. 4, in one embodiment, the bidirectional inter prediction method may include the following steps.

S400: The video decoder 202 parses an obtained bitstream, and obtains indication information.

In one embodiment, the video decoder 202 parses the bitstream, and determines, based on a value of a syntactic element in the bitstream, an inter prediction mode used to perform inter prediction on a current picture block in a current frame. When the inter prediction mode is a bidirectional inter prediction mode, the video decoder 202 obtains the indication information.

The video decoder 202 may receive the encoded bitstream sent by the video encoder 102, or may obtain the encoded bitstream from a storage apparatus 40.

In one embodiment, the video decoder 202 in this embodiment of this application determines, based on a value of a syntactic element inter_pred_idc, the inter prediction mode used to perform inter prediction on the current picture block in the current frame. It can be learned from the foregoing description that inter prediction includes unidirectional inter prediction and bidirectional inter prediction. In one embodiment, when the value of the syntactic element inter_pred_idc is 0, the video decoder 202 determines that the inter prediction mode used to perform inter prediction on the current picture block in the current frame is forward inter prediction. When the value of the syntactic element inter_pred_idc is 1, the video decoder 202 determines that the inter prediction mode used to perform inter prediction on the current picture block in the current frame is backward inter prediction. When the value of the syntactic element inter_pred_idc is 2, the video decoder 202 determines that the inter prediction mode used to perform inter prediction on the current picture block in the current frame is bidirectional inter prediction.

In one embodiment, after determining that the value of the syntactic element inter_pred_idc is 2, the video decoder 202 obtains indication information used to indicate to determine second motion information based on first motion information. The first motion information is motion information of the current picture block in a first direction, the second motion information is motion information of the current picture block in a second direction, and the first direction and the second direction are different.

A picture block in this application may be a basic unit for performing video encoding or video decoding, for example, a coding unit (CU), or may be a basic unit for performing a prediction operation, for example, a prediction unit (PU). This is not specifically limited in this embodiment of this application.

If the picture block is the basic unit for performing video encoding or video decoding, the current picture block in this embodiment of this application includes at least one subblock. Correspondingly, the first motion information includes motion information of each of the at least one subblock in the current picture block in the first direction, the second motion information includes motion information of each of the at least one subblock in the current picture block in the second direction, and the indication information is used to indicate to determine motion information of a subblock in the second direction based on motion information of the subblock in the first direction.

The video decoder 202 may obtain the indication information in a number of manners.

In a first embodiment, the video decoder 202 parses a first identifier. When a value of the first identifier is a first preset value, the video decoder 202 determines to parse the first motion information, and determines the second motion information based on the first motion information. In other words, the video decoder 202 obtains the indication information. When the value of the first identifier is an eighth preset value, the video decoder 202 parses the bitstream to obtain a fifth identifier. When a value of the fifth identifier is a fifth preset value, the video decoder 202 determines to parse the second motion information, and calculates the first motion information based on the second motion information. When the value of the fifth identifier is a ninth preset value, the video decoder 202 obtains the first motion information and the second motion information. The first preset value and the fifth preset value may be the same, or may be different. This is not specifically limited in this embodiment of this application.

For example, the first identifier is mv_derived_flag_l0, the fifth identifier is mv_derived_flag_l1, both the first preset value and the fifth preset value are 1, and both the eighth preset value and the ninth preset value are 0. The video decoder 202 first parses mv_derived_flag_l0. When a value of mv_derived_flag_l0 is 1, the video decoder 202 parses the first motion information, and determines the second motion information based on the first motion information. When the value of mv_derived_flag_l0 is 0, the video decoder 202 parses mv_derived_flag_l1. When a value of mv_derived_flag_l1 is 1, the video decoder 202 parses the second motion information, and calculates the first motion information based on the second motion information. When both the value of mv_derived_flag_l0 and the value of mv_derived_flag_l1 are 0, the video decoder 202 parses the first motion information and the second motion information.

In a second embodiment, the video decoder 202 parses a second identifier. When a value of the second identifier is a second preset value, the video decoder 202 determines to calculate motion information of the current picture block by using a motion information derivation algorithm. Then, the video decoder 202 parses a third identifier. When a value of the third identifier is a third preset value, the video decoder 202 determines to parse the first motion information, and determines the second motion information based on the first motion information. In other words, the video decoder 202 obtains the indication information. When the value of the third identifier is a sixth preset value, the video decoder 202 determines to parse the second motion information, and calculates the first motion information based on the second motion information.

For example, the second identifier is derived_mv_flag, the third identifier is derived_mv_direction, the third preset value is 1, and the sixth preset value is 0. The video decoder 202 first parses derived_mv_flag. When a value of derived_mv_flag is 1, the video decoder 202 determines to calculate the motion information of the current picture block by using the motion information derivation algorithm. When the value of derived_mv_flag is 0, the video decoder 202 parses the first motion information and the second motion information. When a value of derived_mv_direction is 1, the video decoder 202 parses the first motion information, and determines the second motion information based on the first motion information. When the value of derived_mv_direction is 0, the video decoder 202 parses the second motion information, and calculates the first motion information based on the second motion information.

In a third embodiment, the video decoder 202 parses a second identifier. When a value of the second identifier is a second preset value, the video decoder 202 determines to calculate motion information of the current picture block by using a motion information derivation algorithm. Then, the video decoder 202 determines, based on a preset derived direction, to parse the first motion information, and determines the second motion information based on the first motion information. In other words, the video decoder 202 obtains the indication information. In other words, in this embodiment, "determining the second motion information based on the first motion information" is preset. When the value of the second identifier is a seventh preset value, the video decoder 202 parses the first motion information and the second motion information.

For example, the second identifier is derived_mv_flag, the second preset value is 1, and the seventh preset value is 0. The video decoder 202 parses derived_mv_flag. When a value of derived_mv_flag is 1, the video decoder 202 determines to calculate the motion information of the current picture block by using the motion information derivation algorithm. Further, the video decoder 202 determines to parse the first motion information, and determines the second motion information based on the first motion information. When the value of derived_mv_flag is 0, the video decoder 202 parses the first motion information and the second motion information.

In a fourth embodiment, the video decoder 202 parses a fourth identifier (For example, mv_derived_flag_l0). When a value of the fourth identifier is a fourth preset value, the video decoder 202 determines to calculate motion information of the current picture block by using a motion information derivation algorithm, and calculates a variable derived_ref_num based on a first reference frame list and a second reference frame list. The variable represents a quantity of mirrored/linear reference frame pairs that can be constituted by a first reference frame and a second reference frame. When the quantity of reference frame pairs is 1, the video decoder 202 directly determines reference frame index values. Then, the video decoder 202 determines, based on a preset derived direction, to parse the first motion information, and determines the second motion information based on the first motion information. In other words, the video decoder 202 obtains the indication information. The first reference frame list is a reference frame list of the current picture block in the first direction, the second reference frame list is a reference frame list of the current picture block in the second direction, the first reference frame is a reference frame of the current picture block in the first direction, and the second reference frame is a reference frame of the current picture block in the second direction. A reference frame index value in this embodiment of this application is a number of a reference frame in a corresponding reference frame list.

For example, a sequence number of the current frame is 4, the first reference frame list is {2, 0}, the second reference frame list is {6, 7}, and it is determined, based on the following condition B or condition C, that a reference frame whose sequence number is 2 in the first reference frame list and a reference frame whose sequence number is 6 in the second reference frame list can constitute a reference frame pair. In this case, both an index value of the first reference frame and an index value of the second reference frame are 0.

For example, the sequence number of the current frame is 4, the first reference frame list is {2, 0}, the second reference frame list is {6, 7}, and it is determined, based on the following condition B or condition C, that the reference frame whose sequence number is 2 in the first reference frame list and the reference frame whose sequence number is 6 in the second reference frame list can constitute the reference frame pair, and that a reference frame whose sequence number is 0 in the first reference frame list and a reference frame whose sequence number is 7 in the second reference frame list also can constitute a reference frame pair. In this case, the video decoder 202 needs to parse the reference frame index value.

Further, when determining that the inter prediction mode is the bidirectional inter prediction mode, the video decoder 202 may further determine whether feature information of the current frame satisfies a preset condition. In this way, when the feature information of the current frame satisfies the preset condition, the video decoder 202 obtains the indication information. To be specific, a process of S401 may include: The video decoder 202 obtains the indication information when determining that the inter prediction mode is the bidirectional inter prediction mode and that the feature information of the current frame satisfies a first preset condition.

The feature information of the current frame includes at least one of a sequence number, a temporal level ID (TID), or a quantity of reference frames. The bitstream obtained by the video decoder 202 includes a sequence parameter set (SPS), a picture parameter set (PPS), a slice header or a slice segment header, and encoded picture data. Then, the video decoder 202 parses the bitstream to obtain the feature information of the current frame.

The preset condition includes at least one of the following conditions:

Condition A: The current picture block has at least two reference frames.

Condition B: The sequence number of the current frame, a sequence number of the first reference frame, and a sequence number of the second reference frame satisfies the following formula:

$$POC\_Cur - POC\_listX = POC\_listY - POC\_Cur$$

In the foregoing formula, POC_Cur represents the sequence number of the current frame, POC_listX represents the sequence number of the first reference frame, POC_listY represents the sequence number of the second reference frame, the first reference frame is the reference frame of the current picture block in the first direction, and the second reference frame is the reference frame of the current picture block in the second direction.

Condition C: The sequence number of the current frame, the sequence number of the first reference frame, and the sequence number of the second reference frame satisfies the following formula:

$$(POC\_Cur - POC\_listX)*(POC\_listY - POC\_Cur) > 0$$

In the foregoing formula, POC_Cur represents the sequence number of the current frame, POC_listX represents the sequence number of the first reference frame, POC_listY represents the sequence number of the second reference frame, the first reference frame is the reference frame of the current picture block in the first direction, and the second reference frame is the reference frame of the current picture block in the second direction.

Condition D: The TID of the current frame is greater than or equal to a preset value.

The preset condition in this embodiment of this application may be preset, or may be specified in a higher layer syntax, for example, in a parameter set such as the SPS, the PPS, the slice header, or the slice segment header. This is not specifically limited in this embodiment of this application.

In one embodiment, for the condition B (or the condition C), the video decoder 202 obtains one reference frame sequence number from each of the first reference frame list and the second reference frame list, and determines whether the obtained reference frame sequence number and the sequence number of the current frame satisfy the condition B or the condition C. The indication information is obtained when the condition B (or the condition C) is satisfied.

In this embodiment, a method used by the video decoder 202 to obtain the indication information when determining that the inter prediction mode is the bidirectional inter prediction mode and that the feature information of the current frame satisfies the preset condition is the same as a method used by the video decoder 202 to obtain the indication information when determining that the inter prediction mode is the bidirectional inter prediction mode.

Based on the foregoing descriptions, Table 1 is a syntax table used when the video decoder 202 obtains, when determining that the inter prediction mode is the bidirectional inter prediction mode and that the feature information of the current frame satisfies the preset condition, the indication information in the first embodiment. prediction_unit( ) is a syntax structure of a prediction picture block, and describes a method for determining motion information of each subblock in the current picture block.

In Table 1, x0 and y0 respectively indicate a horizontal coordinate offset and a vertical coordinate offset of a subblock in the current picture block relative to the top-left corner of the current picture block, nPbW indicates the width of the current picture block, and nPbH indicates the height of the current picture block. When a value of inter_pred_idc[x0][y0] is PRED_L0, it indicates that inter prediction of a current subblock is forward prediction. When the value of inter_pred_idc[x0][y0] is PRED_L1, it indicates that inter prediction of the current subblock is backward prediction. When the value of inter_pred_idc[x0][y0] is PRED_BI, it indicates that inter prediction of the current subblock is bidirectional prediction.

For bidirectional inter prediction (that is, inter_pred_idc[x0][y0]==PRED_BI), if the preset condition (conditions) is satisfied, mv_derived_flag_l0[x0][y0] is parsed. If the value of mv_derived_flag_l0 is not the first preset value, mv_derived_flag_l1[x0] [y0] is parsed. When the value of mv_derived_flag_l0 is the first preset value or the value of mv_derived_flag_l1[x0][y0] is the fifth preset value, motion information of the subblock of the current picture block is determined, to be specific, a reference frame index value ref_idx_l0[x0] [y0], a motion vector predictor flag mvp_l0_flag[x0][y0], and a motion vector difference mvd_coding(x0, y0, 0) are determined.

TABLE 1 prediction_unit(x0, y0, nPbW, nPbH) {
...
/* motion vector coding */
if( slice_type==B )
inter_pred_idc[x0][y0]

TABLE 1-continued

```
if( inter_pred_idc[x0][y0]==PRED_L0 ) {
  if( num_ref_idx_l0_active_minus1 > 0 )
  ref_idx_l0[x0][y0]
  mvd_coding( x0, y0, 0 )
  mvp_l0_flag[x0][y0]
}
if( inter_pred_idc[x0][y0]==PRED_L1 ) {
  if( num_ref_idx_l1_active_minus1 > 0 )
  ref_idx_l1[x0][y0]
  mvd_coding( x0, y0, 1)
  mvp_l1_flag[x0][y0]
}
if( inter_pred_idc[x0][y0]==PRED_BI ) {
  if( conditions ) {
    mv_derived_flag_l0[x0][y0]
    if( !mv_derived_flag_l0[x0][y0]) {
      mv_derived_flag_l1[x0][y0]
    }
    if( !mv_derived_flag_l0[x0][y0]) {
      if( num_ref_idx_l0_active_minus1 > 0 )
      ref_idx_l0[x0][y0]
      mvd_coding( x0, y0, 0 )
      mvp_l0_flag[x0][y0]
    }
    if( !mv_derived_flag_l1[x0][y0]) {
      if( num_ref_idx_l1_active_minus1 > 0 )
      ref_idx_l1[x0][y0]
      mvd_coding(x0, y0, 0 )
      mvp_l1_flag[x0][y0]
    }
  }
}
```

Based on the foregoing descriptions, Table 2 is a syntax table used when the video decoder 202 obtains, when determining that the inter prediction mode is the bidirectional inter prediction mode and that the feature information of the current frame satisfies the preset condition, the indication information by using the third embodiment.

In Table 2, for bidirectional inter prediction (in other words, inter_pred_idc[x0][y0]==PRED_BI), if the preset condition (conditions) is satisfied, derived_mv_flag[x0][y0] is parsed. When a value of derived_mv_flag[x0][y0] is the second preset value, the motion information of the subblock of the current picture block is determined, to be specific, a reference frame index value ref_idx_lx[x0] [y0], a motion vector predictor flag mvp_lx_flag[x0][y0], and a motion vector difference mvd_coding(x0, y0, x) are determined.

TABLE 2

```
prediction_unit(x0, y0, nPbW, nPbH) {
  ...
  /* motion vector coding */
  if( slice_type==B )
  inter_pred_idc[x0][y0]
  if( inter_pred_idc[x0][y0]==PRED_L0 ) {
    if( num_ref_idx_l0_active_minus1 > 0 )
    ref_idx_l0[x0][y0]
    mvd_coding( x0, y0, 0 )
    mvp_l0_flag[x0][y0]
  }
  if( inter_pred_idc[x0][y0]==PRED_L1 ) {
    if( num_ref_idx_l1_active_minus1 >0 )
    ref_idx_l1[x0][y0]
    mvd_coding( x0, y0, 1)
    mvp_l1_flag[x0][y0]
  }
  if( inter_pred_idc[x0][y0]==PRED_BI ) {
    if( conditions ) {
      derived_mv_flag[x0 ][y0 ]
      if( derived_mv_flag[x0][y0]) {
        if( num_ref_idx_lx_active_minus1 > 0 )
        ref_idx_lx[x0 ][y0 ]
```

TABLE 2-continued

```
        mvd_coding( x0, y0, x )
        mvp_lx_flag[x0 ][y0 ]
      } else {
        ...
      }
    }
```

Based on the foregoing descriptions, Table 3 is a syntax table used when the video decoder 202 obtains, when determining that the inter prediction mode is the bidirectional inter prediction mode and that the feature information of the current frame satisfies the first preset condition, the indication information by using the fourth embodiment.

In Table 3, for bidirectional inter prediction (in other words, inter_pred_idc[x0][y0]==PRED_BI), if the preset condition(s) is satisfied, derived_mv_flag[x0][y0] is parsed. When the value of derived_mv_flag[x0][y0] is the fourth preset value, derived_ref_num is determined, and when a value of derived_ref_num is greater than 1, the motion information of the subblock in the current picture block is determined, to be specific, the reference frame index value ref_idx_lx[x0][y0], the motion vector predictor flag mvp_lx_ flag[x0][y0], and the motion vector difference mvd_coding(x0, y0, x) are determined.

TABLE 3

```
prediction_unit(x0, y0, nPbW, nPbH) {
  ...
  /* motion vector coding */
  if( slice_type==B )
  inter_pred_idc[x0][y0]
  if( inter_pred_idc[x0][y0]==PRED_L0 ) {
    if( num_ref_idx_l0_active_minus1 > 0 )
    ref_idx_l0[x0][y0]
    mvd_coding( x0, y0, 0 )
    mvp_l0_flag[x0][y0]
  }
  if( inter_pred_idc[x0][y0]==PRED_L1 ) {
    if( num_ref_idx_l1_active_minus1 > 0 )
    ref_idx_l1[x0][y0]
    mvd_coding( x0, y0, 1)
    mvp_l1_flag[x0][y0]
  }
  if( inter_pred_idc[x0][y0]==PRED_BI ) {
    if( conditions ) {
      derived_mv_flag[x0][y0]
      if( derived_mv_flag[x0][y0]) {
        if( num_ref_idx_lx_active_minus1 > 0 && derived_ref_num > 1)
        ref_idx_lx[x0][y0]
        mvd_coding(x0, y0, x )
        mvp_lx_flag[x0][y0]
      } else {
        ...
      }
    }
}
```

The first identifier, the second identifier, the third identifier, and the fourth identifier may all be preset, or may be specified in the higher layer syntax, for example, in the parameter set such as the SPS, the PPS, the slice header, or the slice segment header. This is not specifically limited in this embodiment of this application.

The video decoder 202 obtains the indication information when determining that the inter prediction mode is the bidirectional inter prediction mode and that the feature information of the current frame satisfies the preset condition. This effectively improves a decoding rate of the video decoder 202, and reduces information redundancy.

S401: The video decoder 202 obtains the first motion information.

In one embodiment, the video decoder 202 parses the bitstream to obtain the index value of the first reference frame, a first motion vector predictor flag, and a first motion vector difference, in other words, to obtain the first motion information. The first motion vector predictor flag is used to indicate an index value of a first predicted motion vector in a first candidate motion vector list, the first predicted motion vector is a predicted motion vector of the current picture block in the first direction, the first motion vector difference is a difference between the first predicted motion vector and a first motion vector, and the first motion vector is a motion vector of the current picture block in the first direction.

In each of the syntax tables shown in Table 1 to Table 3, the video decoder 202 determines motion information of the subblock in the current picture block in the first direction.

S402: The video decoder 202 determines the second motion information based on the first motion information.

In a first embodiment, a method used by the video decoder 202 to determine the second motion information is: The video decoder 202 selects the index value of the first reference frame from the first motion information, and determines the sequence number of the first reference frame based on the index value of the first reference frame and the first reference frame list; calculates the sequence number of the second reference frame based on the sequence number of the current frame and the sequence number of the first reference frame according to a preset formula; determines the index value of the second reference frame based on the sequence number of the second reference frame and the second reference frame list; and determines the second motion information based on the first motion information and the index value of the second reference frame.

Herein, the preset formula may be POC_listY=2*POC_Cur−POC_listX. POC_Cur represents the sequence number of the current frame, POC_listX represents the sequence number of the first reference frame, and POC_listY represents the sequence number of the second reference frame.

For example, if the sequence number of the current frame is 4, the sequence number of the first reference frame is 2, the second reference frame list is [6, 8], and it is determined, according to the formula POC_listY=2*POC_Cur−POC_listX, that the sequence number of the second reference frame is 6, the video decoder 202 determines that the index value ref_lY_idx of the second reference frame is 0.

In one embodiment, the preset formula may alternatively be (POC_Cur−POC_listX) (POC_listY−POC_Cur)>0. It should be noted that, if a number of reference frame sequence numbers in the second reference frame list satisfy the formula, the video decoder 202 first selects a reference frame with a minimum abs((POC_listY−POC_Cur)−(POC_Cur−POC_listX)), and then selects a reference frame with a minimum abs(POC_listY−POC_Cur), to determine the index value of the second reference frame. abs is an absolute value function.

For example, if the sequence number of the current frame is 4, the sequence number of the first reference frame is 2, the second reference frame list is [5, 7, 8], and it is determined, according to the formula (POC_Cur−POC_listX)*(POC_listY−POC_Cur)>0, that the sequence number of the second reference frame is 5, the video decoder 202 determines that the index value ref_lY_idx of the second reference frame is 0.

In one embodiment, the preset formula may alternatively be POC_listX≠POC_listY. It should be noted that, if a number of reference frame sequence numbers in the second reference frame list satisfy the formula, the video decoder 202 first selects a reference frame with a minimum abs((POC_listY−POC_Cur)−(POC_Cur−POC_listX)), and then selects a reference frame with a minimum abs(POC_listY−POC_Cur), to determine the index value of the second reference frame. abs is an absolute value function.

For example, if the sequence number of the current frame is 4, the sequence number of the first reference frame is 2, the second reference frame list is [3, 2, 1, 0], and it is determined, according to the formula POC_listX≠POC_listY, that the sequence number of the second reference frame is 3, the video decoder 202 determines that the index value ref_lY_idx of the second reference frame is 0.

In one embodiment, the preset formula may alternatively be POC_listY0=2*POC_Cur−POC_listX, (POC_Cur−POC_listX)*(POC_listY0'−POC_Cur)>0, and POC_listX≠POC_listY0". In this case, a method used by the video decoder 202 to determine the index value of the second reference frame is: calculating a first sequence number based on the sequence number of the current frame and the sequence number of the first reference frame by using the formula POC_listY0=2*POC_Cur−POC_listX, where POC_Cur represents the sequence number of the current frame, POC_listX represents the sequence number of the first reference frame, and POC_listY0 represents the first sequence number; and when the second reference frame list includes the first sequence number, determining, as the index value of the second reference frame, a number of a reference frame represented by the first sequence number in the second reference frame list; or when the second reference frame list does not include the first sequence number, calculating a second sequence number based on the sequence number of the current frame and the sequence number of the first reference frame by using (POC_Cur−POC_listX)*(POC_listY0'−POC_Cur)>0, where POC_listY0' represents the second sequence number, and when the second reference frame list includes the second sequence number, determining, as the index value of the second reference frame, a number of a reference frame represented by the second sequence number in the second reference frame list, or when the second reference frame list does not include the second sequence number, calculating a third sequence number based on the sequence number of the current frame and the sequence number of the first reference frame by using the formula POC_listX≠POC_listY0", where POC_listY0" represents the third sequence number, and determining, as the index value of the second reference frame, a number of the reference frame represented by the third sequence number in the second reference frame list.

In a second embodiment, a method used by the video decoder 202 to determine the second motion information is: The video decoder 202 parses the bitstream to obtain the index value of the second reference frame, and determines the second motion information based on the first motion information and the index value of the second reference frame. The index value of the second reference frame may be preset, or may be specified in the parameter set, for example, in the SPS, the PPS, the slice header, or the slice segment header. This is not specifically limited in this embodiment of this application.

It can be learned that, in both the first embodiment and the second embodiment, the video decoder 202 determines the second motion information based on the first motion information and the index value of the second reference frame.

In one embodiment, the video decoder 202 may calculate all motion information of the current picture block in the second direction, or may calculate a part of the motion information of the current picture block in the second direction.

The following describes a process in which the video decoder 202 determines the second motion information based on the first motion information and the index value of the second reference frame.

In one embodiment, a method used by the video decoder 202 to determine the second motion information based on the first motion information and the index value of the second reference frame may be: obtaining the index value of the first reference frame in the first motion information, and determining the sequence number of the first reference frame based on the index value of the first reference frame and the first reference frame list; obtaining the index value of the second reference frame, and determining the sequence number of the second reference frame based on the index value of the second reference frame and the second reference frame list; determining the first motion vector (the motion vector of the current picture block in the first direction) based on the first motion vector difference and the first motion vector predictor flag that are in the first motion information; and deriving a second motion vector in the second motion information according to the following formula:

$$mv\_lY = \frac{POC\_Cur - POC\_listY}{POC\_Cur - POC\_listX} \times mv\_lX$$

In the foregoing formula, mv_lY represents the second motion vector, POC_Cur represents the sequence number of the current frame, POC_listX represents the sequence number of the first reference frame, POC_listY represents the sequence number of the second reference frame, mv_lX represents the first motion vector, and the second motion vector is a motion vector of the current picture block in the second direction.

The video decoder 202 constructs a candidate motion information list in a manner that is the same as the manner in which the encoder constructs the candidate motion information list in the AMVP mode or the merge mode, and determines the first predicted motion vector in the candidate motion information list based on the first motion vector prediction flag. In this way, the video decoder 202 may determine a sum of the first predicted motion vector and the first motion vector difference as the first motion vector.

In one embodiment, when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, the video decoder 202 may directly set mv_lY=−mv_lX.

For example, both "the first reference frame is a forward reference frame of the current picture block and the second reference frame is a backward reference frame of the current picture block" and "the first reference frame is a backward reference frame of the current picture block and the second reference frame is a forward reference frame of the current picture block" may be represented by using the formula (POC_Cur−POC_listX)*(POC_listY−POC_Cur)>0, or may be represented by using the formula POC_listY=2*POC_Cur−POC_listX.

Both "the first reference frame and the second reference frame each are a forward reference frame of the current picture block" and "the first reference frame and the second reference frame each are a backward reference frame of the current picture block" may be represented by using a formula (POC_Cur−POC_listX)*(POC_listY−POC_Cur)<0.

In one embodiment, a method used by the video decoder 202 to determine the second motion information based on the first motion information and the index value of the second reference frame may be: obtaining the index value of the first reference frame and the first motion vector difference that are in the first motion information, and determining the sequence number of the first reference frame based on the index value of the first reference frame and the first reference frame list; obtaining the index value of the second reference frame, determining the sequence number of the second reference frame based on the index value of the second reference frame and the second reference frame list, and determining a second predicted motion vector based on the index value of the second reference frame and a second candidate predicted motion vector list, where the second predicted motion vector is a predicted motion vector of the current picture block in the second direction; deriving a second motion vector difference in the second motion information according to the following formula:

$$mvd\_lY = \frac{POC\_Cur - POC\_listY}{POC\_Cur - POC\_listX} \times mvd\_lX$$

where mvd_lY represents the second motion vector difference, POC_Cur represents the sequence number of the current frame, POC_listX represents the sequence number of the first reference frame, POC_listY represents the sequence number of the second reference frame, and mvd_lX represents the first motion vector difference; and determining a second motion vector based on the second predicted motion vector and the second motion vector difference, where the second motion vector is a motion vector of the current picture block in the second direction.

In one embodiment, when the first reference frame is a forward reference frame of the current picture block and the second reference frame is a backward reference frame of the current picture block, or when the first reference frame is a backward reference frame of the current picture block and the second reference frame is a forward reference frame of the current picture block, or when the first reference frame and the second reference frame each are a forward reference frame of the current picture block, or when the first reference frame and the second reference frame each are a backward reference frame of the current picture block, the video decoder 202 may directly set mvd_lY=−mvd_lX.

For example, if (POC_Cur−POC_listX)*(POC_listY−POC_Cur)>0, POC_listY=2*POC_Cur−POC_listX, or (POC_Cur−POC_listX)*(POC_listY−POC_Cur)<0, the video decoder 202 directly sets mvd_lY=−mvd_lX.

S403: The video decoder 202 determines prediction samples of the current picture block based on the first motion information and the second motion information.

In one embodiment, the video decoder 202 determines the first motion vector and the second motion vector in S402. In this way, the video decoder 202 may determine a first reference picture block based on the first motion vector and the first reference frame list, and determine a second reference picture block based on the second motion vector and the second reference frame list. Further, the video decoder 202 determines the prediction samples of the current picture block based on the first reference picture block and the second reference picture block. In other words, the video decoder 202 completes a motion compensation process.

For a method used by the video decoder 202 to determine the prediction samples of the current picture block based on the first reference picture block and the second reference picture block, refer to any existing method. This is not specifically limited in this embodiment of this application.

In the bidirectional inter prediction method provided in this embodiment of this application, the video decoder 202 may obtain only the first motion information from the encoded bitstream. After obtaining the first motion information, the video decoder 202 calculates the second motion information based on the first motion information, and further determines the prediction samples of the current picture block based on the first motion information and the second motion information. According to the method provided in this application, motion information of each picture block in all directions no longer needs to be transmitted, which is different from the prior art. This effectively reduces an amount of transmitted motion information, and improves effective utilization of transmission resources, a transmission rate, and coding compression efficiency.

The bidirectional inter prediction method shown in FIG. 4 is described for the current picture block, that is, it may be understood that inter prediction is performed on the current picture block based on the AMVP mode.

It is easy to understand that the bidirectional inter prediction method provided in this application is also applicable to a non-translational motion model prediction mode, for example, a 4-parameter affine transform motion model, a 6-parameter affine transform motion model, or an 8-parameter bilinear motion model. In this scenario, the current picture block includes the at least one subblock, and the motion information of the current picture block includes the motion information of each of all the subblocks of the current picture block. A method used by the video decoder 202 to determine the motion information (e.g., the motion information in the first direction and the motion information in the second direction) of each subblock is similar to a method used by the video decoder 202 to determine the motion information of the current picture block.

In the non-translational motion model prediction mode, the video decoder 202 calculates a motion vector of the $i^{th}$ control point in the second direction based on a motion vector of the $i^{th}$ control point in the first direction according to the following formula:

$$mvi\_lY = \frac{POC\_Cur - POC\_listY}{POC\_Cur - POC\_listX} \times mvi\_lX$$

In the foregoing formula, mvi_lY represents the motion vector of the $i^{th}$ control point in the second direction, mvi_lX represents the motion vector of the $i^{th}$ control point in the first direction, POC_Cur represents the sequence number of the current frame, POC_listX represents the sequence number of the first reference frame, and POC_listY represents the sequence number of the second reference frame.

Correspondingly, the video decoder 202 calculates a motion vector difference of the $i^{th}$ control point in the second direction based on a motion vector difference of the $i^{th}$ control point in the first direction by using the following formula:

$$mvdi\_lY = \frac{POC\_Cur - POC\_listY}{POC\_Cur - POC\_listX} \times mvdi\_lX$$

In the foregoing formula, mvdi_lY represents the motion vector difference of the $i^{th}$ control point in the second direction, mvdi_lX represents the motion vector difference of the $i^{th}$ control point in the first direction, POC_Cur represents the sequence number of the current frame, POC_listX represents the sequence number of the first reference frame, and POC_listY represents the sequence number of the second reference frame.

Compared with the video decoder 202, the video encoder 102 in the embodiments performs bidirectional motion estimation on the current picture block, to determine the motion information of the current picture block in the first direction, and calculates the motion information of the current picture block in the second direction based on the motion information of the current picture block in the first direction. In this way, the video encoder 102 determines the prediction picture block of the current picture block based on the motion information of the current picture block in the first direction and the motion information of the current picture block in the second direction. Then, the video encoder 102 performs operations such as transform and quantization on a residual between the current picture block and the prediction picture block of the current picture block to generate the bitstream, and sends the bitstream to the video decoder 202. The bitstream includes the motion information of the current picture block in the first direction.

For a method used by the video encoder 102 to calculate the motion information of the current picture block in the second direction based on the motion information of the current picture block in the first direction, refer to the method used by the video decoder 202 to determine the second motion information based on the first motion information, in other words, refer to the descriptions in S402. Details are not described again in this application.

In conclusion, according to the bidirectional inter prediction method provided in this application, during bidirectional inter prediction, motion information of each picture block in all directions no longer needs to be transmitted, and only motion information in a direction needs to be transmitted. This effectively reduces an amount of transmitted motion information, and improves effective utilization of transmission resources, a transmission rate, and coding compression efficiency.

An embodiment of this application provides a bidirectional inter prediction apparatus. The bidirectional inter prediction apparatus may be a video decoder. In one embodiment, the bidirectional inter prediction apparatus is configured to perform the steps performed by the video decoder 202 in the foregoing bidirectional inter prediction method. The bidirectional inter prediction apparatus provided in this embodiment of this application may include modules for corresponding steps.

In the embodiments of this application, the bidirectional inter prediction apparatus may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. In the embodiments of this application, module division is an example, and is merely a logical function division. In actual implementation, another division manner may be used.

Figure 5:
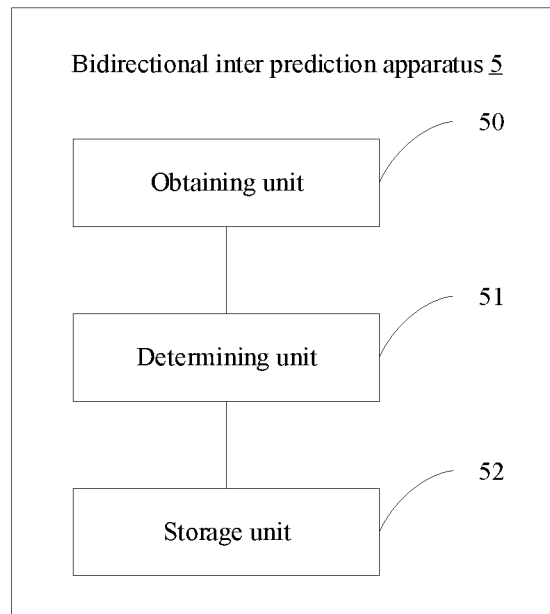
FIG. 5 is a first schematic structural diagram of a bidirectional inter prediction apparatus according to an embodiment.

When each functional module is obtained through division based on a corresponding function, FIG. 5 is an example schematic structural diagram of the bidirectional inter prediction apparatus in the foregoing embodiments. As shown in FIG. 5, a bidirectional inter prediction apparatus 5 includes an obtaining unit 50 and a determining unit 51.

The obtaining unit 50 is configured to support the bidirectional inter prediction apparatus to perform S400, S401, and the like in the foregoing embodiment, and/or is used in another process of the technology described in this specification.

The determining unit 51 is configured to support the bidirectional inter prediction apparatus to perform S402, S403, and the like in the foregoing embodiment, and/or is used in another process of the technology described in this specification.

All related content of the steps in the foregoing method embodiments may be cited in descriptions of corresponding functional modules. Details are not described herein again.

Certainly, the bidirectional inter prediction apparatus provided in this embodiment of this application includes but is not limited to the foregoing modules. For example, the bidirectional inter prediction apparatus may further include a storage unit 52.

The storage unit 52 may be configured to store program code and data of the bidirectional inter prediction apparatus.

Figure 6:
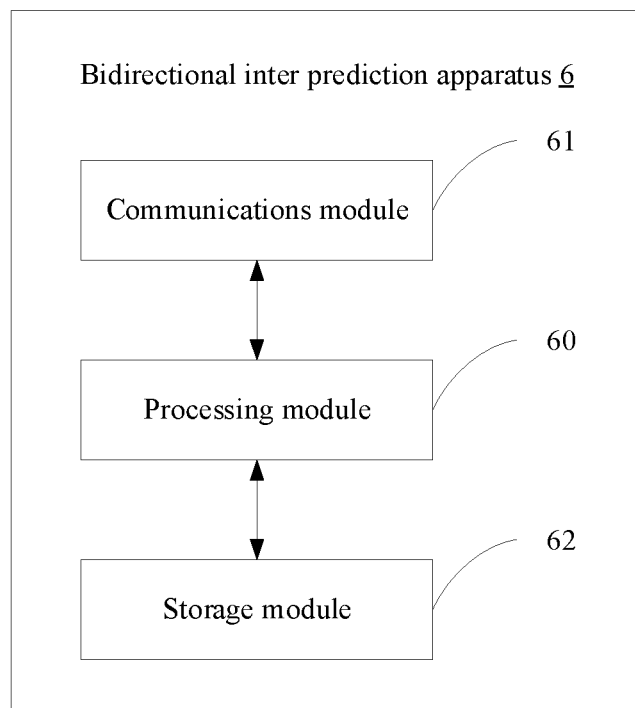
FIG. 6 is a second schematic structural diagram of a bidirectional inter prediction apparatus according to an embodiment.

When an integrated unit is used, FIG. 6 is an example schematic structural diagram of the bidirectional inter prediction apparatus provided in the embodiments of this application. As shown in FIG. 6, a bidirectional inter prediction apparatus 6 includes a processing module 60 and a communications module 61. The processing module 60 is configured to control and manage an action of the bidirectional inter prediction apparatus, for example, perform steps performed by the obtaining unit 50 and the determining unit 51, and/or configured to perform another process of the technology described in this specification. The communications module 61 is configured to support interaction between the bidirectional inter prediction apparatus and another device. As shown in FIG. 6, the bidirectional inter prediction apparatus may further include a storage module 62. The storage module 62 is configured to store program code and data of the bidirectional inter prediction apparatus, for example, store content stored by the storage unit 52.

The processing module 60 may be a processor or a controller, for example, may be a central processing unit (CPU), a general-purpose processor, a digital signal processor (DSP), an ASIC, an FPGA or another programmable logic device, a transistor logic device, a hardware component, or any combination thereof. The processor or the controller may implement or execute various example logical blocks, modules, and circuits described with reference to the content disclosed in this application. The processor may alternatively be a combination for implementing a computing function, for example, a combination including one or more microprocessors, or a combination of a DSP and a microprocessor. The communications module 61 may be a transceiver, an RF circuit, a communications interface, or the like. The storage module 62 may be a memory.

All related content of the scenarios in the foregoing method embodiments may be cited in function descriptions of corresponding functional modules. Details are not described herein again.

Both the bidirectional inter prediction apparatus 5 and the bidirectional inter prediction apparatus 6 may perform the bidirectional inter prediction method shown in FIG. 4. In one embodiment, the bidirectional inter prediction apparatus 5 and the bidirectional inter prediction apparatus 6 may be video decoding apparatuses or other devices having a video coding function. The bidirectional inter prediction apparatus 5 and the bidirectional inter prediction apparatus 6 may be configured to perform picture prediction in a decoding process.

This application further provides a terminal. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the bidirectional inter prediction method in the embodiments of this application.

The terminal herein may be a video display device, a smartphone, a portable computer, or another device that can process or play a video.

This application further provides a video decoder, including a non-volatile storage medium and a central processing unit. The non-volatile storage medium stores an executable program. The central processing unit is connected to the non-volatile storage medium, and executes the executable program to perform the bidirectional inter prediction method in the embodiments of this application.

This application further provides a decoder. The decoder includes the bidirectional inter prediction apparatus (e.g., the bidirectional inter prediction apparatus 5 or the bidirectional inter prediction apparatus 6) in the embodiments of this application, and a reconstruction module. The reconstruction module is configured to determine reconstructed sample values of a current picture block based on prediction samples obtained by the bidirectional inter prediction apparatus.

Another embodiment of this application further provides a computer-readable storage medium. The computer-readable storage medium includes one or more pieces of program code. The one or more pieces of program code include an instruction. When a processor of a terminal executes the program code, the terminal performs the bidirectional inter prediction method shown in FIG. 4.

In another embodiment of this application, a computer program product is further provided. The computer program product includes computer-executable instructions. The computer-executable instructions are stored in a computer-readable storage medium. At least one processor of a terminal may read the computer-executable instruction from the computer-readable storage medium. The at least one processor executes the computer-executable instruction, to enable the terminal to perform the steps performed by the video decoder 202 in the bidirectional inter prediction method shown in FIG. 4.

All or some of the foregoing embodiments may be implemented by using software, hardware, firmware, or any combination thereof. For example, the foregoing described units (such as obtaining unit 50, determining unit 51, coding unit, prediction unit, etc.) may be implemented in software and/or hardware, for example a central processing unit (CPU), a general-purpose processor, a digital signal processor (DSP), an ASIC, an FPGA or another programmable logic device, a transistor logic device, a hardware component, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive Solid State Disk (SSD)), or the like.

The foregoing descriptions about the embodiments allow a person skilled in the art to clearly understand that, for the purpose of convenient and brief description, division of the foregoing functional modules is taken as an example for illustration. In actual application, the foregoing functions can be allocated to different functional modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a number of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, may be located in one place, or may be distributed in different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A decoding method, wherein the method is applied to bidirectional inter prediction, and the method comprises:
   parsing a bitstream to obtain a first identifier, and a first motion vector difference of a current picture block;
   when a value of the first identifier is a first preset value, determining a second motion vector difference of the current picture block based on the first motion vector difference, wherein the first motion vector difference belongs to motion information of the current picture block in a first direction, and the second motion vector difference belongs to motion information of the current picture block in a second direction; and
   determining prediction samples of the current picture block based on the obtained first motion vector difference and the determined second motion vector difference;
   when the value of the first identifier is a second preset value, parsing the bitstream to obtain the second motion vector difference.

2. The method according to claim 1, wherein the determining a second motion vector difference of the current picture block based on the first motion vector difference comprises:
   obtaining the second motion vector difference according to the following formula:

$$mvd\_lY=-mvd\_lX$$

wherein mvd_lY represents the second motion vector difference, and mvd_lX represents the first motion vector difference.

3. The method according to claim 1, wherein the method further comprises:
   obtaining a first predicted motion vector and a second predicted motion vector;
   determining a first motion vector based on the first predicted motion vector and the first motion vector difference;
   determining a second motion vector based on the second predicted motion vector and the second motion vector difference; and
   determining prediction samples of the current picture block based on the first motion vector and the second motion vector; wherein
   the first predicted motion vector and the first motion vector correspond to the first direction, and the second predicted motion vector and the second motion vector correspond to the second direction.

4. The method according to claim 3, wherein the current picture block comprises a first reference frame list in the first direction and a second reference frame list in the second direction, and the determining prediction samples of the current picture block based on the first motion vector and the second motion vector comprises:
  obtaining a reference frame index of the first reference frame list and a reference frame index of the second reference frame list;
  determining a first reference picture block based on the reference frame index of the first reference frame list, the first motion vector, and the first reference frame list;
  determining a second reference picture block based on the reference frame index of the second reference frame list, the second motion vector, and the second reference frame list; and
  determining the prediction samples of the current picture block based on the first reference picture block and the second reference picture block.

5. The method according to claim 1, the method further comprises: determining that a sequence number of a current frame in which the current picture block is located satisfies a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

6. The method according to claim 1, wherein the method further comprises:
  obtaining a first identifier and when a value of the first identifier is a second preset value, parsing a bitstream to obtain a second motion vector.

7. The method according to claim 1, the method further comprises: determining that a sequence number of a current frame in which the current picture block is located does not satisfy a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

8. The method according to claim 1, wherein the first identifier is in a sequence parameter set (SPS).

9. A bidirectional inter prediction apparatus, comprising:
  an obtaining unit, configured to: parsing a bitstream to obtain a first identifier and a first motion vector difference of a current picture block;
  a determining unit, configured to: when a value of the first identifier is a first preset value, determine a second motion vector difference of the current picture block based on the first motion vector difference, wherein the first motion vector difference belongs to motion information of the current picture block in a first direction, and the second motion vector difference belongs to motion information of the current picture block in a second direction; when the value of the first identifier is a second preset value, parsing a bitstream to obtain the second motion vector difference, and
  a prediction unit, configured to determine prediction samples of the current picture block based on the first motion vector difference and the second motion vector difference.

10. The apparatus according to claim 9, wherein the determining unit is specifically configured to obtain the second motion vector difference according to the following formula:

$$mvd\_lY = -mvd\_lX$$

wherein mvd_lY represents the second motion vector difference, and mvd_lX represents the first motion vector difference.

11. The apparatus according to claim 9, wherein the obtaining unit is specifically configured to obtain a first predicted motion vector and a second predicted motion vector; and the determining unit is specifically configured to: determine a first motion vector based on the first predicted motion vector and the first motion vector difference, determine a second motion vector based on the second predicted motion vector and the second motion vector difference, and determine prediction samples of the current picture block based on the first motion vector and the second motion vector, wherein the first predicted motion vector and the first motion vector correspond to the first direction, and the second predicted motion vector and the second motion vector correspond to the second direction.

12. The apparatus according to claim 9, wherein the current picture block comprises a first reference frame list in the first direction and a second reference frame list in the second direction; the obtaining unit is specifically configured to obtain a reference frame index of the first reference frame list and a reference frame index of the second reference frame list; and the determining unit is specifically configured to: determine a first reference picture block based on the reference frame index of the first reference frame list, a first motion vector, and the first reference frame list, determine a second reference picture block based on the reference frame index of the second reference frame list, a second motion vector, and the second reference frame list, and determine the prediction samples of the current picture block based on the first reference picture block and the second reference picture block.

13. The apparatus according to claim 9, wherein the obtaining unit is further specifically configured to: determine that a sequence number of a current frame in which the current picture block is located satisfies a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

14. An encoding method, wherein the method is applied to bidirectional inter prediction, and the method comprises:
  determining a first motion vector difference of a current picture block;
  determining a first identifier, wherein the first identifier is in a sequence parameter set (SPS), wherein when a value of the first identifier is a first preset value, the first identifier is used to indicate that a second motion vector difference of the current picture block may be determined based on the first motion vector difference, wherein the first motion vector difference belongs to motion information of the current picture block in a first direction, and the second motion vector difference belongs to motion information of the current picture block in a second direction; and
  encoding the first identifier and the first motion vector difference into a bitstream.

15. The method according to claim 14, wherein that a second motion vector difference of the current picture block may be determined based on the first motion vector difference comprises: obtaining the second motion vector difference according to the following formula:

$$mvd\_lY = -mvd\_lX$$

wherein mvd_lY represents the second motion vector difference, and mvd_lX represents the first motion vector difference.

16. The method according to claim 14, wherein the determining a first motion vector difference of a current picture block comprises:
    determining a first motion vector, and obtaining a first predicted motion vector; and
    determining the first motion vector difference based on the first motion vector and the first predicted motion vector, wherein the first predicted motion vector and the first motion vector correspond to the first direction.

17. The method according to claim 14, wherein the method further comprises:
    obtaining a second predicted motion vector;
    determining a second motion vector based on the second predicted motion vector and the second motion vector difference; and
    determining prediction samples of the current picture block based on a first motion vector and the second motion vector, wherein
    second predicted motion vector and the second motion vector correspond to the second direction.

18. The method according to claim 17, wherein the current picture block comprises a first reference frame list in the first direction and a second reference frame list in the second direction, and the determining prediction samples of the current picture block based on the first motion vector and the second motion vector comprises:
    obtaining a reference frame index of the first reference frame list and a reference frame index of the second reference frame list;
    determining a first reference picture block based on the reference frame index of the first reference frame list, the first motion vector, and the first reference frame list;
    determining a second reference picture block based on the reference frame index of the second reference frame list, the second motion vector, and the second reference frame list; and
    determining the prediction samples of the current picture block based on the first reference picture block and the second reference picture block.

19. The method according to claim 14, wherein before the encoding the first identifier into a bitstream, the method further comprises: determining that a sequence number of a current frame in which the current picture block is located satisfies a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

20. The method according to claim 14, comprising: when the value of the first identifier is a second preset value, determine the second motion vector difference of the current picture block, and encode the second motion vector difference into the bitstream.

21. The method according to claim 14, wherein before the encoding the first identifier into a bitstream, the method further comprises: determining that a sequence number of a current frame in which the current picture block is located does not satisfy a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

22. A bidirectional inter prediction apparatus, comprising:
    an obtaining unit, configured to determine a first motion vector difference of a current picture block;
    a determining unit, configured to determine a first identifier, wherein the first identifier is in a sequence parameter set (SPS), wherein when a value of the first identifier is a first preset value, the first identifier is used to indicate that a second motion vector difference of the current picture block may be determined based on the first motion vector difference, wherein the first motion vector difference belongs to motion information of the current picture block in a first direction, and the second motion vector difference belongs to motion information of the current picture block in a second direction; and
    an encoding unit, configured to encode the first identifier and the first motion vector difference into a bitstream.

23. The apparatus according to claim 22, wherein the determining unit is specifically configured to obtain the second motion vector difference according to the following formula:

$$mvd\_lY = -mvd\_lX$$

wherein mvd_lY represents the second motion vector difference, and mvd_lX represents the first motion vector difference.

24. The apparatus according to claim 22, wherein the obtaining unit is specifically configured to:
    determine a first motion vector, and obtain a first predicted motion vector; and
    determine the first motion vector difference based on the first motion vector and the first predicted motion vector, wherein the first predicted motion vector and the first motion vector correspond to the first direction.

25. The apparatus according to claim 22, wherein the obtaining unit is further configured to: obtain a second predicted motion vector, and determine a second motion vector based on the second predicted motion vector and the second motion vector difference; and
    the apparatus further comprises a prediction unit, configured to determine prediction samples of the current picture block based on a first motion vector and the second motion vector, wherein
    the second predicted motion vector and the second motion vector correspond to the second direction.

26. The apparatus according to claim 22, wherein the current picture block comprises a first reference frame list in the first direction and a second reference frame list in the second direction, and a prediction unit is configured to:
    obtain a reference frame index of the first reference frame list and a reference frame index of the second reference frame list;
    determine a first reference picture block based on the reference frame index of the first reference frame list, a first motion vector, and the first reference frame list;
    determine a second reference picture block based on the reference frame index of the second reference frame list, a second motion vector, and the second reference frame list; and determine prediction samples of the current picture block based on the first reference picture block and the second reference picture block.

27. The apparatus according to claim 22, wherein the apparatus comprises a judging unit, configured to: before the encoding unit encodes the first identifier into the bitstream, determine that a sequence number of a current frame in which the current picture block is located satisfies a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

28. The apparatus according to claim 22, wherein the obtaining unit is further configured to: when the value of the first identifier is a second preset value, determine the second motion vector difference of the current picture block, and encode the second motion vector difference into the bitstream.

29. The apparatus according to claim 22, wherein the apparatus comprises a judging unit, configured to: before the encoding unit encodes the first identifier into the bitstream, determine that a sequence number of a current frame in which the current picture block is located does not satisfy a preset condition, wherein the preset condition comprises a condition that the sequence number of the current frame is between a sequence number of a first reference frame and a sequence number of a second reference frame, the first reference frame belongs to a first reference frame list, and the second reference frame belongs to a second reference frame list.

30. A non-transitory storage medium, wherein the non-transitory storage medium comprises the bitstream generated by using the method according to claim 14.

31. A non-transitory storage medium, wherein the non-transitory storage medium comprises a bitstream obtained through decoding by using the method according to claim 1.

32. An image processing apparatus, comprising a processor, a memory, a communications interface, and a bus, wherein the processor is connected to the memory and the communications interface by using the bus;
the memory is configured to store an instruction; and
the processor is configured to execute the instruction, and when the processor executes the instruction stored in the memory, the processor is enabled to perform the encoding method according to claim 14.

33. An image processing apparatus, comprising a processor, a memory, a communications interface, and a bus, wherein the processor is connected to the memory and the communications interface by using the bus;
the memory is configured to store an instruction; and
the processor is configured to execute the instruction, and when the processor executes the instruction stored in the memory, the processor is enabled to perform the decoding method according to claim 1.

* * * * *

UNITED STATES PATENT AND TRADEMARK OFFICE
CERTIFICATE OF CORRECTION

Page 1 of 1

PATENT NO. : 11,838,535 B2
APPLICATION NO. : 17/827361
DATED : December 5, 2023
INVENTOR(S) : Huanbang Chen, Haitao Yang and Jianle Chen It is certified that error appears in the above-identified patent and that said Letters Patent is hereby corrected as shown below:

On the Title Page

In item [63] under the Related U.S. Application Data, at Lines 1 and 2, please delete "Continuation of application No. 16/948,625, filed on Sep. 25, 2019" and insert --Continuation of application No. 16/948,625, filed on Sep. 25, 2020--.

Signed and Sealed this
Tenth Day of September, 2024

Katherine Kelly Vidal
*Director of the United States Patent and Trademark Office*